(12) United States Patent
Tanaka et al.

(10) Patent No.: US 7,882,431 B2
(45) Date of Patent: Feb. 1, 2011

(54) GRID SYSTEM SELECTION SUPPORTING DEVICE, GRID SYSTEM SELECTION SUPPORTING METHOD, AND STORAGE MEDIUM

(75) Inventors: Toshio Tanaka, Shiojiri (JP); Hitoshi Yamakado, Hino (JP); Shinji Miwa, Hokuto (JP)

(73) Assignee: Seiko Epson Corporation (JP)

( * ) Notice: Subject to any disclaimer, the term of this patent is extended or adjusted under 35 U.S.C. 154(b) by 1017 days.

(21) Appl. No.: 11/708,700

(22) Filed: Feb. 20, 2007

(65) Prior Publication Data

US 2007/0200557 A1 Aug. 30, 2007

(30) Foreign Application Priority Data

Feb. 21, 2006 (JP) ............... 2006-043474
Mar. 28, 2006 (JP) ............... 2006-088293
Apr. 26, 2006 (JP) ............... 2006-121654

(51) Int. Cl.
G06F 17/00 (2006.01)
G09G 5/00 (2006.01)
(52) U.S. Cl. ..................... 715/244; 345/645
(58) Field of Classification Search ........ 715/243, 715/244, 245, 246; 345/645
See application file for complete search history.

(56) References Cited

U.S. PATENT DOCUMENTS

| 5,636,132 A * | 6/1997 | Kamdar ............... 716/2 |
| 6,400,996 B1 * | 6/2002 | Hoffberg et al. ........ 700/83 |
| 6,456,738 B1 * | 9/2002 | Tsukasa ............. 382/175 |
| 2006/0150125 A1 * | 7/2006 | Gupta et al. ........... 715/864 |
| 2007/0097148 A1 | 5/2007 | Tanaka |

FOREIGN PATENT DOCUMENTS

| JP | 64-017156 | 1/1989 |
| JP | 03-269678 | 12/1991 |
| JP | 08-194832 | 7/1996 |
| JP | 2003-331309 | 11/2003 |
| JP | 2005-284940 | 10/2005 |
| JP | 2007-149061 | 6/2007 |

* cited by examiner

*Primary Examiner*—Laurie Ries
(74) *Attorney, Agent, or Firm*—Harness, Dickey & Pierce, P.L.C.

(57) ABSTRACT

There is disclosed a grid system selection supporting device comprising: a storage unit that stores use histories for a plurality of grid systems; and an extraction unit that extracts at least one of the plurality of grid systems, based on the use histories.

12 Claims, 25 Drawing Sheets

FIG. 4

| GRID SYSTEM | REFERENCE | GRID INTERVAL (mm) | SNAP POSITION |
|---|---|---|---|
| FIRST GRID SYSTEM GS1 | (0,0) | 10 | UPPER LEFT AND LOWER RIGHT |
| SECOND GRID SYSTEM GS2 | (0,0) | 20 | UPPER LEFT AND LOWER RIGHT |
| THIRD GRID SYSTEM GS3 | (0,0) | 5 | UPPER LEFT AND LOWER RIGHT |
| FOURTH GRID SYSTEM GS4 | (0,0) | 20 | LOWER MIDDLE |
| FIFTH GRID SYSTEM GS5 | (30,30) | 100 | LEFT MIDDLE |

FIG. 5A    FIRST GRID SYSTEM GS1   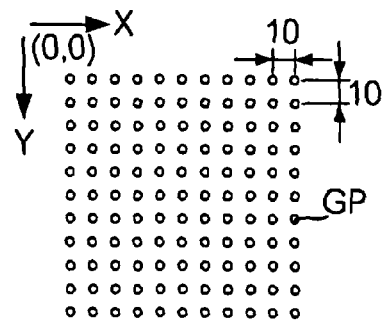
FIG. 5B    SECOND GRID SYSTEM GS2  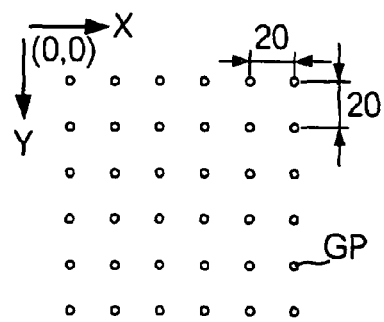
FIG. 5C    THIRD GRID SYSTEM GS3   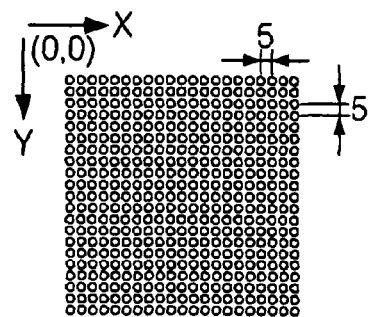
FIG. 5D    FOURTH GRID SYSTEM GS4  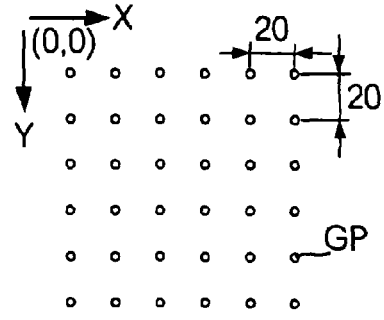
FIG. 5E    FIFTH GRID SYSTEM GS5   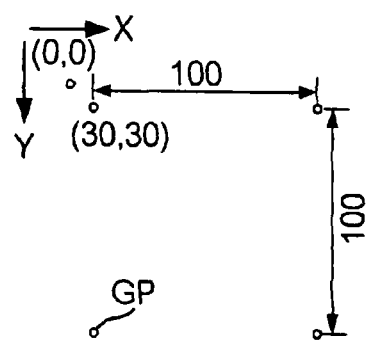

FIG. 6A  UPPER LEFT AND LOWER RIGHT
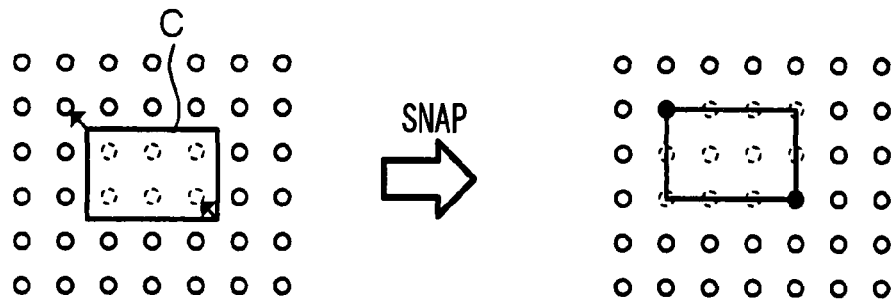
FIG. 6B  LOWER MIDDLE
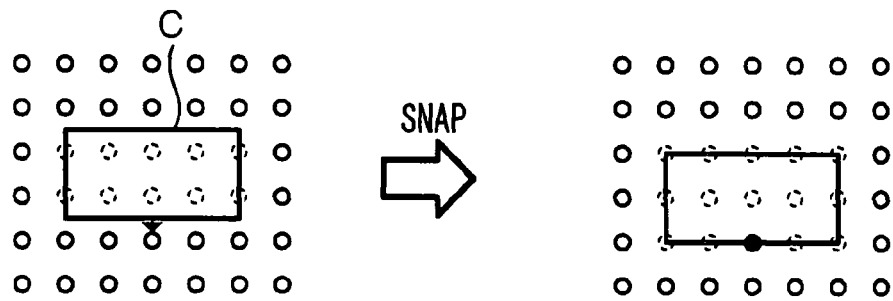
FIG. 6C  LEFT MIDDLE
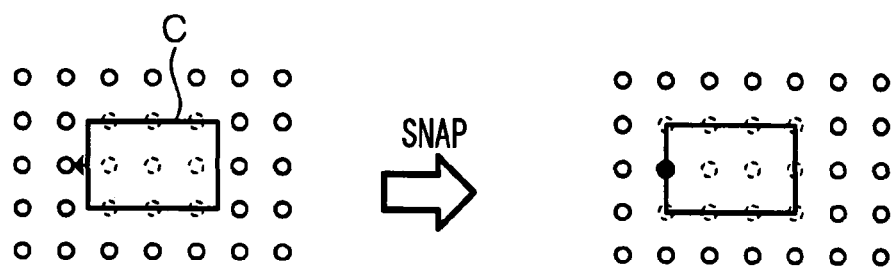

FIG. 8A

INITIAL STATE

| GRID SYSTEM | GS1 | GS2 | GS3 | GS4 | GS5 |
|---|---|---|---|---|---|
| USE COUNT CT | 0 | 0 | 0 | 0 | 0 |
| AVAILABILITY FLAG | AVAILABLE | AVAILABLE | AVAILABLE | AVAILABLE | AVAILABLE |

FIG. 8B

AFTER POSITIONING CONTENT SET C1

| GRID SYSTEM | GS1 | GS2 | GS3 | GS4 | GS5 |
|---|---|---|---|---|---|
| USE COUNT CT | 1 | 0 | 1 | 1 | 0 |
| AVAILABILITY FLAG | AVAILABLE | UNAVAILABLE | AVAILABLE | AVAILABLE | UNAVAILABLE |

FIG. 8C

AFTER POSITIONING CONTENT SET C2

| GRID SYSTEM | GS1 | GS2 | GS3 | GS4 | GS5 |
|---|---|---|---|---|---|
| USE COUNT CT | 1 | 0 | 2 | 1 | 0 |
| AVAILABILITY FLAG | AVAILABLE | UNAVAILABLE | AVAILABLE | AVAILABLE | UNAVAILABLE |

FIG. 8D

AFTER POSITIONING CONTENT SET C3

| GRID SYSTEM | GS1 | GS2 | GS3 | GS4 | GS5 |
|---|---|---|---|---|---|
| USE COUNT CT | 1 | 0 | 3 | 1 | 1 |
| AVAILABILITY FLAG | AVAILABLE | UNAVAILABLE | AVAILABLE | AVAILABLE | AVAILABLE |

INITIAL STATE

AFTER POSITIONING CONTENT SET C1

AFTER POSITIONING CONTENT SET C2

AFTER POSITIONING CONTENT SET C3

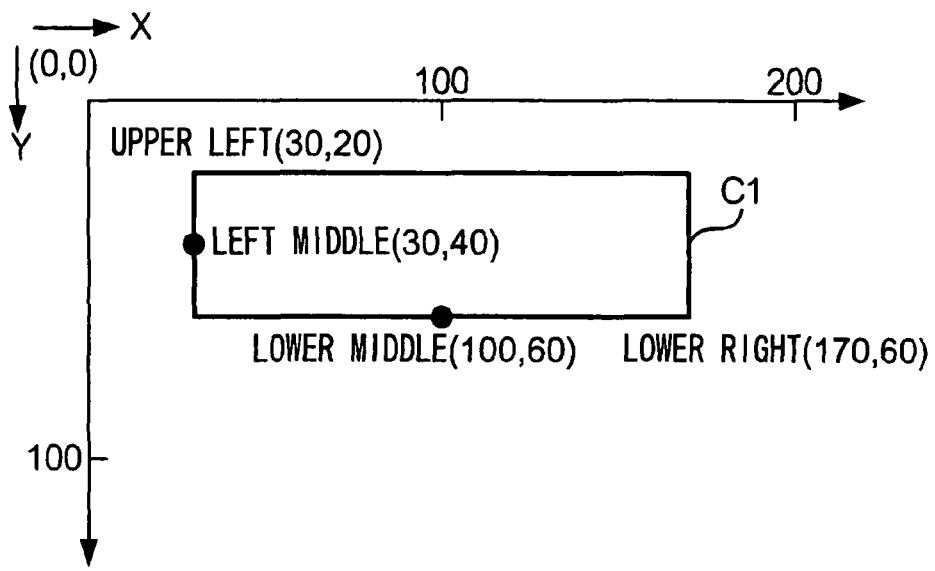
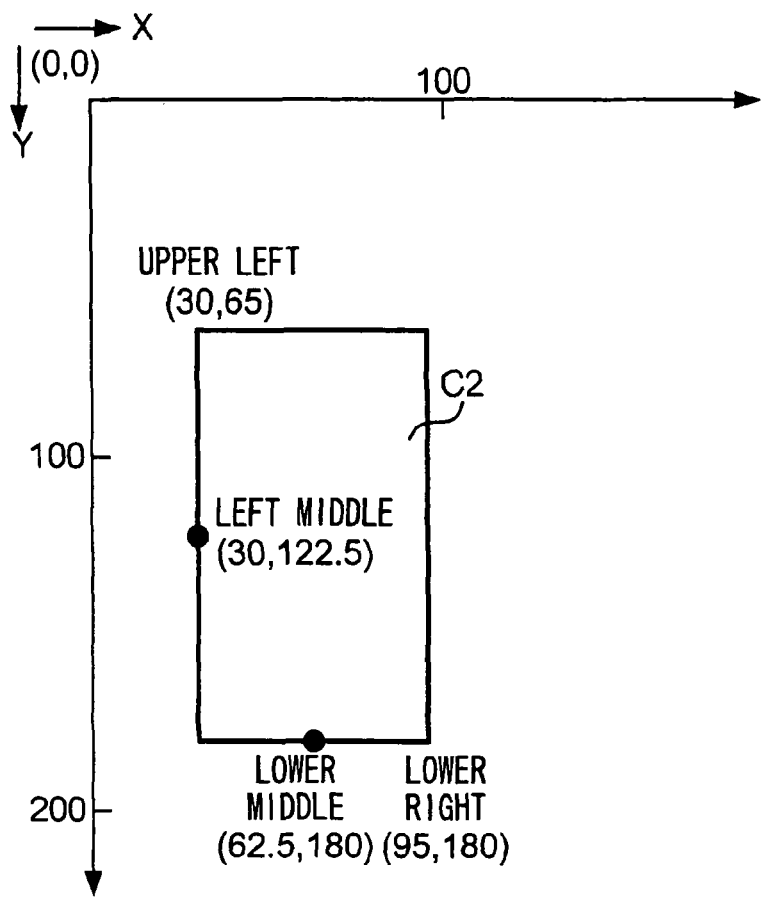

| GRID SYSTEM | GS1 | GS2 | GS3 | GS4 | GS5 |
|---|---|---|---|---|---|
| GRID POINT NUMBER GPN | 660 | 165 | 2580 | 165 | 6 |

| GRID SYSTEM | GS1 | GS2 | GS3 | GS4 | GS5 |
|---|---|---|---|---|---|
| USE COUNT CT | 6 | 5 | 10 | 8 | 2 |
| AVAILABILITY FLAG | — | — | — | — | — |

| GRID SYSTEM | GS1 | GS2 | GS3 | GS4 | GS5 |
|---|---|---|---|---|---|
| USE COUNT CT | 6 | 5 | 10 | 8 | 2 |
| AVAILABILITY FLAG | UNAVAILABLE | UNAVAILABLE | AVAILABLE | AVAILABLE | UNAVAILABLE |

FIG. 18

| GRID POINT GP | SNAP METHOD |
|---|---|
| (0,0) | UPPER LEFT or LOWER RIGHT |
| (5,0) | UPPER LEFT or LOWER RIGHT |
| (10,0) | UPPER LEFT or LOWER RIGHT |
| (15,0) | UPPER LEFT or LOWER RIGHT |
| ⋮ | |
| (10,10) | UPPER LEFT or LOWER RIGHT |
| ⋮ | |
| (20,20) | UPPER LEFT or LOWER RIGHT or LOWER MIDDLE |
| ⋮ | |
| (30,30) | UPPER LEFT or LOWER RIGHT or LEFT MIDDLE |
| ⋮ | |

FIG. 19

| GRID SYSTEM | GS1 | GS2 | GS3 | GS4 | GS5 |
|---|---|---|---|---|---|
| USE COUNT CT | 6 | 5 | 10 | 8 | 2 |

FIG. 20

| GRID POINT GP | USE COUNT CT ||||||
|---|---|---|---|---|---|---|
| | GS1 | GS2 | GS3 | GS4 | GS5 | SUBTOTAL SM |
| (0,0) | | | 10 | | | 10 |
| (5,0) | | | 10 | | | 10 |
| (10,0) | | | 10 | | | 10 |
| (15,0) | | | 10 | | | 10 |
| ⋮ | | | | | | |
| (10,10) | 6 | | 10 | | | 16 |
| ⋮ | | | | | | |
| (20,20) | 6 | 5 | 10 | 2 | | 23 |
| ⋮ | | | | | | |
| (30,30) | 6 | | 10 | | 2 | 18 |
| ⋮ | | | | | | |

FIG. 21

| SUBTOTAL SM OF USE COUNTS | GRID POINT GP | ACCUMULATED TOTAL OF SUBTOTALS OF USE COUNTS | AVAILABILITY FLAG |
|---|---|---|---|
| 23 | (20,20) | 23 | AVAILABLE |
| 23 | (40,40) | 46 | AVAILABLE |
| 23 | (60,60) | 69 | AVAILABLE |
| ⋮ | | | |
| 18 | (30,30) | 325 | AVAILABLE |
| ⋮ | | | |
| 16 | (10,10) | 496 | AVAILABLE |
| 10 | (0,0) | 504 | UNAVAILABLE |
| 10 | (5,0) | 514 | UNAVAILABLE |
| ⋮ | | | |

FIG. 24

| GRID SYSTEM | GS1 | GS2 | GS3 | GS4 | GS5 |
|---|---|---|---|---|---|
| USE COUNT CT | 8 | 5 | 10 | 6 | 2 |

FIG. 25

| GRID POINT GP | USE COUNT CT | | | | | SUBTOTAL SM |
|---|---|---|---|---|---|---|
| | GS1 | GS2 | GS3 | GS4 | GS5 | |
| (0,0) | 8 | 5 | 10 | 6 | | 23 |
| (5,0) | | | 10 | | | 10 |
| (10,0) | | | 10 | | | 10 |
| (15,0) | | | 10 | | | 10 |
| ⋮ | | | | | | |
| (10,10) | 8 | | 10 | | | 18 |
| ⋮ | | | | | | |
| (20,20) | 8 | 5 | 10 | 6 | | 23 |
| ⋮ | | | | | | |
| (30,30) | 8 | | 10 | | 2 | 18 |
| ⋮ | | | | | | |

| GRID POINT GP | SUBTOTAL SM OF USE COUNTS | WEIGHTED DISTANCE PD | SNAP |
|---|---|---|---|
| (15,15) | 10 | {(15-17)²+(15-17)²}×23/10 = 18.4 | YES |
| (15,20) | 10 | {(15-17)²+(20-17)²}×23/10 = 29.9 | YES |
| (20,15) | 10 | {(20-17)²+(15-17)²}×23/10 = 29.9 | YES |
| (20,20) | 23 | {(20-17)²+(20-17)²}×23/23 = 18 | NO |

| GRID POINT GP | SUBTOTAL SM OF USE COUNTS | WEIGHTED DISTANCE PD | SNAP |
|---|---|---|---|
| (15,15) | 10 | $\{(15-17)^2+(15-16)^2\}\times 23/10=11.5$ | NO |
| (15,20) | 10 | $\{(15-17)^2+(20-16)^2\}\times 23/10=46$ | YES |
| (20,15) | 10 | $\{(20-17)^2+(15-16)^2\}\times 23/10=23$ | YES |
| (20,20) | 23 | $\{(20-17)^2+(20-16)^2\}\times 23/23=25$ | YES |

FIG. 30
| GRID SYSTEM | REFERENCE | GRID INTERVAL (mm) | SNAP POSITION |
|---|---|---|---|
| SIXTH GRID SYSTEM GS6 | (0,0) | 15 | UPPER LEFT AND LOWER RIGHT |
| SECOND GRID SYSTEM GS2 | (0,0) | 20 | UPPER LEFT AND LOWER RIGHT |
| FOURTH GRID SYSTEM GS4 | (0,0) | 20 | LOWER MIDDLE |
| SEVENTH GRID SYSTEM GS7 | (30,30) | X DIRECTION:100, Y DIRECTION:30 | LEFT MIDDLE |
FIG. 31A  SIXTH GRID SYSTEM GS6
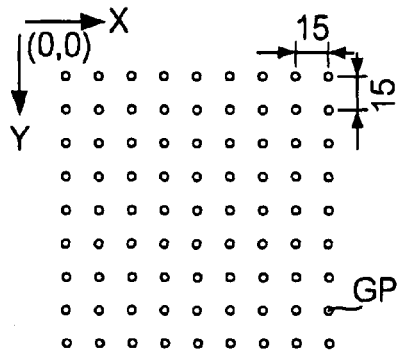
FIG. 31B  SEVENTH GRID SYSTEM GS7
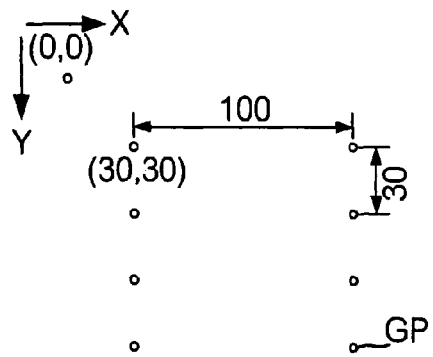
FIG. 32
| GRID SYSTEM | GS6 | GS2 | GS4 | GS7 |
|---|---|---|---|---|
| USE COUNT CT | 4 | 6 | 2 | 2 |

*FIG. 33*

| GRID POINT GP | USE COUNT CT ||||  SUBTOTAL SM |
|---|---|---|---|---|---|
| | GS6 | GS2 | GS4 | GS7 | |
| (0,0) | 4 | 6 | 2 | — | 10 |
| (0,15) | 4 | — | — | — | 4 |
| (0,20) | — | 6 | 2 | — | 10 |
| (0,30) | 4 | — | — | — | 4 |
| (0,40) | — | | | | |
| ⋮ | | | | | |
| (15,0) | 4 | — | — | — | 4 |
| (15,15) | 4 | — | — | — | 4 |
| (15,30) | 4 | — | — | — | 4 |
| ⋮ | | | | | |
| (20,0) | — | 6 | 2 | — | 6 |
| (20,20) | — | 6 | 2 | — | 6 |
| (20,40) | — | 6 | 2 | — | 6 |
| (20,60) | — | 6 | 2 | — | 6 |
| ⋮ | | | | | |
| (30,15) | 4 | — | — | — | 4 |
| (30,30) | 4 | — | — | 2 | 4 |
| (30,45) | 4 | — | — | — | 4 |
| (30,60) | 4 | — | — | 2 | 4 |
| (30,75) | 4 | — | — | — | 4 |
| ⋮ | | | | | |
| (40,0) | — | 6 | 2 | — | 6 |
| (40,20) | — | 6 | 2 | — | 6 |
| (40,40) | — | 6 | 2 | — | 6 |
| (40,60) | — | 6 | 2 | — | 6 |
| (40,80) | — | 6 | 2 | — | 6 |
| ⋮ | | | | | |
| (45,0) | 4 | — | — | — | 4 |
| (45,15) | 4 | — | — | — | 4 |
| (45,30) | 4 | — | — | — | 4 |
| (45,45) | 4 | — | — | — | 4 |
| (45,60) | 4 | — | — | — | 4 |
| (45,75) | 4 | — | — | — | 4 |
| ⋮ | | | | | |
| (60,0) | 4 | 6 | 2 | — | 10 |
| (60,15) | 4 | — | — | — | 4 |
| (60,20) | — | 6 | 2 | — | 6 |
| (60,30) | 4 | — | — | — | 4 |
| (60,40) | — | 6 | 2 | — | 6 |
| (60,45) | 4 | — | — | — | 4 |
| (60,60) | 4 | 6 | 2 | — | 10 |
| (60,75) | 4 | — | — | — | 4 |
| (60,80) | — | 6 | 2 | — | 6 |
| ⋮ | | | | | |
| (75,0) | 4 | — | — | — | 4 |
| (75,15) | 4 | — | — | — | 4 |
| (75,30) | 4 | — | — | — | 4 |
| (75,45) | 4 | — | — | — | 4 |
| (75,60) | 4 | — | — | — | 4 |
| (75,75) | 4 | — | — | — | 4 |

FIG. 35

| GRID POINT GP | SUBTOTAL SM OF USE COUNTS | WEIGHTED DISTANCE PD | SNAP |
|---|---|---|---|
| (30,30) | 4 | $\{(30-50)^2+(30-50)^2\} \times (10/4)^2 = 2500.00$ | YES |
| (30,45) | 4 | $\{(30-50)^2+(45-50)^2\} \times (10/4)^2 = 2656.25$ | YES |
| (30,60) | 4 | $\{(30-50)^2+(60-50)^2\} \times (10/4)^2 = 3125.00$ | YES |
| (40,40) | 6 | $\{(40-50)^2+(40-50)^2\} \times (10/6)^2 = 555.56$ | YES |
| (40,60) | 6 | $\{(40-50)^2+(60-50)^2\} \times (10/6)^2 = 555.56$ | YES |
| (45,30) | 4 | $\{(45-50)^2+(30-50)^2\} \times (10/4)^2 = 2656.25$ | YES |
| (45,45) | 4 | $\{(40-50)^2+(45-50)^2\} \times (10/4)^2 = 312.50$ | YES |
| (45,60) | 4 | $\{(45-50)^2+(60-50)^2\} \times (10/4)^2 = 781.25$ | YES |
| (60,30) | 4 | $\{(60-50)^2+(30-50)^2\} \times (10/4)^2 = 3125.00$ | YES |
| (60,40) | 6 | $\{(60-50)^2+(40-50)^2\} \times (10/6)^2 = 1250.00$ | YES |
| (60,45) | 4 | $\{(60-50)^2+(45-50)^2\} \times (10/4)^2 = 781.25$ | YES |
| (60,60) | 10 | $\{(60-50)^2+(60-50)^2\} \times (10/10)^2 = 200.00$ | NO |

FIG. 36

| GRID POINT GP | SUBTOTAL SM OF USE COUNTS | WEIGHTED DISTANCE PD | SNAP |
|---|---|---|---|
| (40,20) | 6 | $\{(40-53)^2+(20-30)^2\} \times (6/6)^4 = 269.00$ | YES |
| (40,40) | 6 | $\{(40-53)^2+(40-30)^2\} \times (6/6)^4 = 269.00$ | YES |
| (45,15) | 4 | $\{(45-53)^2+(15-30)^2\} \times (6/4)^4 = 1463.06$ | YES |
| (45,30) | 4 | $\{(45-53)^2+(30-30)^2\} \times (6/4)^4 = 324.00$ | YES |
| (45,45) | 4 | $\{(45-53)^2+(45-30)^2\} \times (6/4)^4 = 1463.06$ | YES |
| (60,15) | 4 | $\{(60-53)^2+(15-30)^2\} \times (6/4)^4 = 1387.13$ | YES |
| (60,20) | 6 | $\{(60-53)^2+(20-30)^2\} \times (6/6)^4 = 149.00$ | NO |
| (60,30) | 4 | $\{(60-53)^2+(30-30)^2\} \times (6/4)^4 = 248.06$ | YES |
| (60,40) | 6 | $\{(60-53)^2+(40-30)^2\} \times (6/6)^4 = 149.00$ | NO |
| (60,45) | 4 | $\{(60-53)^2+(45-30)^2\} \times (6/4)^4 = 1387.13$ | YES |

FIG. 37

| GRID POINT GP | SUBTOTAL SM OF USE COUNTS | WEIGHTED DISTANCE PD | SNAP |
|---|---|---|---|
| (15,0) | 4 | $\{(15-53)^2+(0-30)^2\} \times (10/4)^4 = 91562.50$ | YES |
| (15,15) | 4 | $\{(15-53)^2+(15-30)^2\} \times (10/4)^4 = 65195.31$ | YES |
| (15,30) | 4 | $\{(15-53)^2+(30-30)^2\} \times (10/4)^4 = 56406.25$ | YES |
| (15,45) | 4 | $\{(15-53)^2+(45-30)^2\} \times (10/4)^4 = 65195.31$ | YES |
| (15,60) | 4 | $\{(15-53)^2+(60-30)^2\} \times (10/4)^4 = 91562.50$ | YES |
| (20,0) | 6 | $\{(20-53)^2+(0-30)^2\} \times (10/6)^4 = 15347.22$ | YES |
| (20,20) | 6 | $\{(20-53)^2+(20-30)^2\} \times (10/6)^4 = 9174.38$ | YES |
| (20,40) | 6 | $\{(20-53)^2+(40-30)^2\} \times (10/6)^4 = 9174.38$ | YES |
| (20,60) | 6 | $\{(20-53)^2+(60-30)^2\} \times (10/6)^4 = 15347.22$ | YES |
| (30,0) | 4 | $\{(30-53)^2+(0-30)^2\} \times (10/4)^4 = 55820.31$ | YES |
| (30,15) | 4 | $\{(30-53)^2+(15-30)^2\} \times (10/4)^4 = 29453.13$ | YES |
| (30,30) | 4 | $\{(30-53)^2+(30-30)^2\} \times (10/4)^4 = 20664.06$ | YES |
| (30,45) | 4 | $\{(30-53)^2+(45-30)^2\} \times (10/4)^4 = 29453.13$ | YES |
| (30,60) | 4 | $\{(30-53)^2+(60-30)^2\} \times (10/4)^4 = 55820.31$ | YES |
| (40,0) | 6 | $\{(40-53)^2+(0-30)^2\} \times (10/6)^4 = 8248.46$ | YES |
| (40,20) | 6 | $\{(40-53)^2+(20-30)^2\} \times (10/6)^4 = 2075.62$ | YES |
| (40,40) | 6 | $\{(40-53)^2+(40-30)^2\} \times (10/6)^4 = 2075.62$ | YES |
| (40,60) | 6 | $\{(40-53)^2+(60-30)^2\} \times (10/6)^4 = 8248.46$ | YES |
| (45,0) | 4 | $\{(45-53)^2+(0-30)^2\} \times (10/4)^4 = 37656.25$ | YES |
| (45,15) | 4 | $\{(45-53)^2+(15-30)^2\} \times (10/4)^4 = 11289.06$ | YES |
| (45,30) | 4 | $\{(45-53)^2+(30-30)^2\} \times (10/4)^4 = 2500.00$ | YES |
| (45,45) | 4 | $\{(45-53)^2+(45-30)^2\} \times (10/4)^4 = 11289.06$ | YES |
| (45,60) | 4 | $\{(45-53)^2+(60-30)^2\} \times (10/4)^4 = 37656.25$ | YES |
| (60,0) | 10 | $\{(60-53)^2+(0-30)^2\} \times (10/10)^4 = 949.00$ | NO |
| (60,15) | 4 | $\{(60-53)^2+(15-30)^2\} \times (10/4)^4 = 10703.13$ | YES |
| (60,20) | 6 | $\{(60-53)^2+(20-30)^2\} \times (10/6)^4 = 1149.69$ | YES |
| (60,30) | 4 | $\{(60-53)^2+(30-30)^2\} \times (10/4)^4 = 1914.06$ | YES |
| (60,40) | 6 | $\{(60-53)^2+(40-30)^2\} \times (10/6)^4 = 1149.69$ | YES |
| (60,45) | 4 | $\{(60-53)^2+(45-30)^2\} \times (10/4)^4 = 14414.06$ | YES |
| (60,60) | 10 | $\{(60-53)^2+(60-30)^2\} \times (10/10)^4 = 949.00$ | NO |
| (75,0) | 4 | $\{(75-53)^2+(0-30)^2\} \times (10/4)^4 = 54062.50$ | YES |
| (75,15) | 4 | $\{(75-53)^2+(15-30)^2\} \times (10/4)^4 = 27695.31$ | YES |
| (75,30) | 4 | $\{(75-53)^2+(30-30)^2\} \times (10/4)^4 = 18906.25$ | YES |
| (75,45) | 4 | $\{(75-53)^2+(0-30)^2\} \times (10/4)^4 = 27695.31$ | YES |
| (75,60) | 4 | $\{(75-53)^2+(60-30)^2\} \times (10/4)^4 = 54062.50$ | YES |
| (80,0) | 6 | $\{(80-53)^2+(0-30)^2\} \times (10/6)^4 = 12569.44$ | YES |
| (80,20) | 6 | $\{(80-53)^2+(20-30)^2\} \times (10/6)^4 = 6396.60$ | YES |
| (80,40) | 6 | $\{(80-53)^2+(40-30)^2\} \times (10/6)^4 = 6396.60$ | YES |
| (80,60) | 6 | $\{(80-53)^2+(60-30)^2\} \times (10/6)^4 = 12569.44$ | YES |
| (90,0) | 4 | $\{(90-53)^2+(0-30)^2\} \times (10/4)^4 = 88632.81$ | YES |
| (90,15) | 4 | $\{(90-53)^2+(15-30)^2\} \times (10/4)^4 = 62265.63$ | YES |
| (90,30) | 4 | $\{(90-53)^2+(30-30)^2\} \times (10/4)^4 = 53476.56$ | YES |
| (90,45) | 4 | $\{(90-53)^2+(45-30)^2\} \times (10/4)^4 = 62265.63$ | YES |
| (90,60) | 4 | $\{(90-53)^2+(60-30)^2\} \times (10/4)^4 = 88632.81$ | YES |

GRID SYSTEM SELECTION SUPPORTING DEVICE, GRID SYSTEM SELECTION SUPPORTING METHOD, AND STORAGE MEDIUM

The entire disclosures of Japanese Patent Applications No. 2006-43474 filed on Feb. 21, 2006, No. 2006-88293 filed on Mar. 28, 2006, and No. 2006-121654 filed on Apr. 26, 2006 are expressly incorporated by reference herein.

BACKGROUND

1. Technical Field

The present invention relates to techniques for supporting editing of documents.

2. Related Art

There are known systems using grids. For example, JP-A-64-17156 and JP-A-3-269678 disclose techniques which allow an operator to select or set a desired one of plural grids when inputting coordinates or a figure.

SUMMARY

According to JP-A-64-17156 and JP-A-3-269678, an operator is required to select or set a grid on the basis of his or her experience and intuition. Consequently, inputting of coordinates or a figure is not always an easy operation.

In this respect, the present invention provides a technique for supporting selection of a grid.

According to one aspect of the invention, there is provided a grid system selection supporting device comprising: a storage unit that stores use histories respectively for a plurality of grid systems; and an extraction unit that extracts at least one of the plurality of grid systems, based on the use histories.

Alternatively, in the grid system selection supporting device, the use histories may include use counts as numbers of times by which each of the plurality of grid systems has been used, and the extraction unit extracts the at least one of the plurality of grid systems, based on the use counts.

Further alternatively, the grid system selection supporting device may further comprise a management unit that manages the use counts.

Also alternatively in the grid system selection supporting device, the storage unit may further store numbers of grid points which are included in each of the grid systems, the management unit calculates a total of the grid points by adding up the numbers of grid points in order from the system having the greatest use count among the plurality of grid systems, and the extraction unit extracts one or more of the plurality of grid systems, the grid points of which have been added up before the total of the grid points exceeds a threshold.

Also alternatively in the grid system selection supporting device, the management unit may calculate an accumulated total of use counts of the grid points by adding up totals of use counts of the grid points in order from the system having the greatest use count among the plurality of grid systems, and the extraction unit extracts one or more of the plurality of grid systems, the total of the use count of the grid points of each of which have been added up before the accumulated total exceeds a threshold.

Further alternatively in the grid system selection supporting device, initial values of the use histories may reflect use histories concerning a content set prior to a content set as a target being now processed.

According to another aspect of the invention, there is provided a grid system selection supporting method comprising extracting at least one of a plurality of grid systems, based on use histories for each of the plurality of grid systems.

According to still another aspect of the invention, there is provided a computer readable storage medium storing a program causing a computer to execute extracting at least one of a plurality of grid systems, based on use histories for each of the plurality of grid systems.

According to still another aspect of the invention, there is provided a grid system selection supporting device comprising: a storage unit that stores use histories for each of a plurality of grid systems, each having a plurality of grid points; an operation unit for instructing positioning of a content set; a calculation unit that calculates weighted distances obtained by weighting distances on the basis of the use histories, the distances respectively being between a plurality of close grid points to the content set among the plurality of grid points and the content set, the positioning of which has been instructed by the operation unit; and an extraction unit that extracts one of the plurality of close grid points on the basis of the weighted distances calculated by the calculation unit.

Alternatively in the grid system selection supporting device, the calculation unit may calculate each of the weighted distances by multiplying a distance between the content set and one of the plurality of close grid points as a target currently being calculated, by a ratio between a maximum value among totals of use counts of the plurality of close grid points and a use count of the close grid point as the target currently being calculated.

Also alternatively in the grid system selection supporting device, the extraction unit may extract one grid point from among the plurality of close grid points, the extracted one grid point having the shortest weighted distance of the weighted distances calculated by the calculation unit.

According to still another aspect of the invention, there is provided a grid system selection supporting method comprising: instructing positioning of a content set; calculating weighted distances obtained by weighting distances on the basis of use histories for each of a plurality of grid systems, each having a plurality of grid points, the distances respectively being between a plurality of close grid points to the content set among the plurality of grid points and the content set, the positioning of which has been instructed; and extracting one of the plurality of close grid points on the basis of the weighted distances calculated.

According to still another aspect of the invention, there is provided a computer readable storage medium storing a program causing a computer to execute: instructing positioning of a content set; calculating weighted distances obtained by weighting distances on the basis of use histories for each of a plurality of grid systems, each having a plurality of grid points, the distances respectively being between a plurality of close grid points to the content set among the plurality of grid points and the content set whose positioning has been instructed; and extracting one of the plurality of close grid points on the basis of the weighted distances calculated.

BRIEF DESCRIPTION OF THE DRAWINGS

Exemplary embodiments of the present invention will be described in detail based on the following figures, wherein:

FIG. 4 is a table exemplarily showing details of grid systems;

FIGS. 5A-5E exemplarily show details of grid systems;

FIGS. 6A-6C also exemplarily show details of grid systems;

FIGS. 8A-8D exemplarily show use histories;

FIG. 12 shows a snapped content set C1;

FIG. 13 shows a snapped content set C2;

FIG. 18 is a table showing grid points and snap methods related to the grid points;

FIG. 19 is a table exemplarily showing use histories according to Modification 4;

FIG. 20 is a table showing use counts totalized for each grid point;

FIG. 21 is a table exemplarily showing availability flags according to Modification 4;

FIG. 24 is a table exemplarily showing use counts;

FIG. 25 is a table exemplarily showing totalized use counts;

FIG. 30 is a table showing grid systems according to Modification 2;

FIGS. 31A and 31B show grid systems according to Modification 2;

FIG. 32 is a table exemplarily showing a part of use histories according to Modification 2;

FIG. 33 is a table showing totalized results of use counts;

FIG. 35 is a table exemplarily showing calculated weighted distances PD;

FIG. 36 is a table exemplarily showing weighted distances according to Modification 3; and FIG. 37 is a table exemplarily showing weighted distances according to Modification 4.

EXEMPLARY EMBODIMENTS

1 First Embodiment 1-1 Structure

Figure 1:
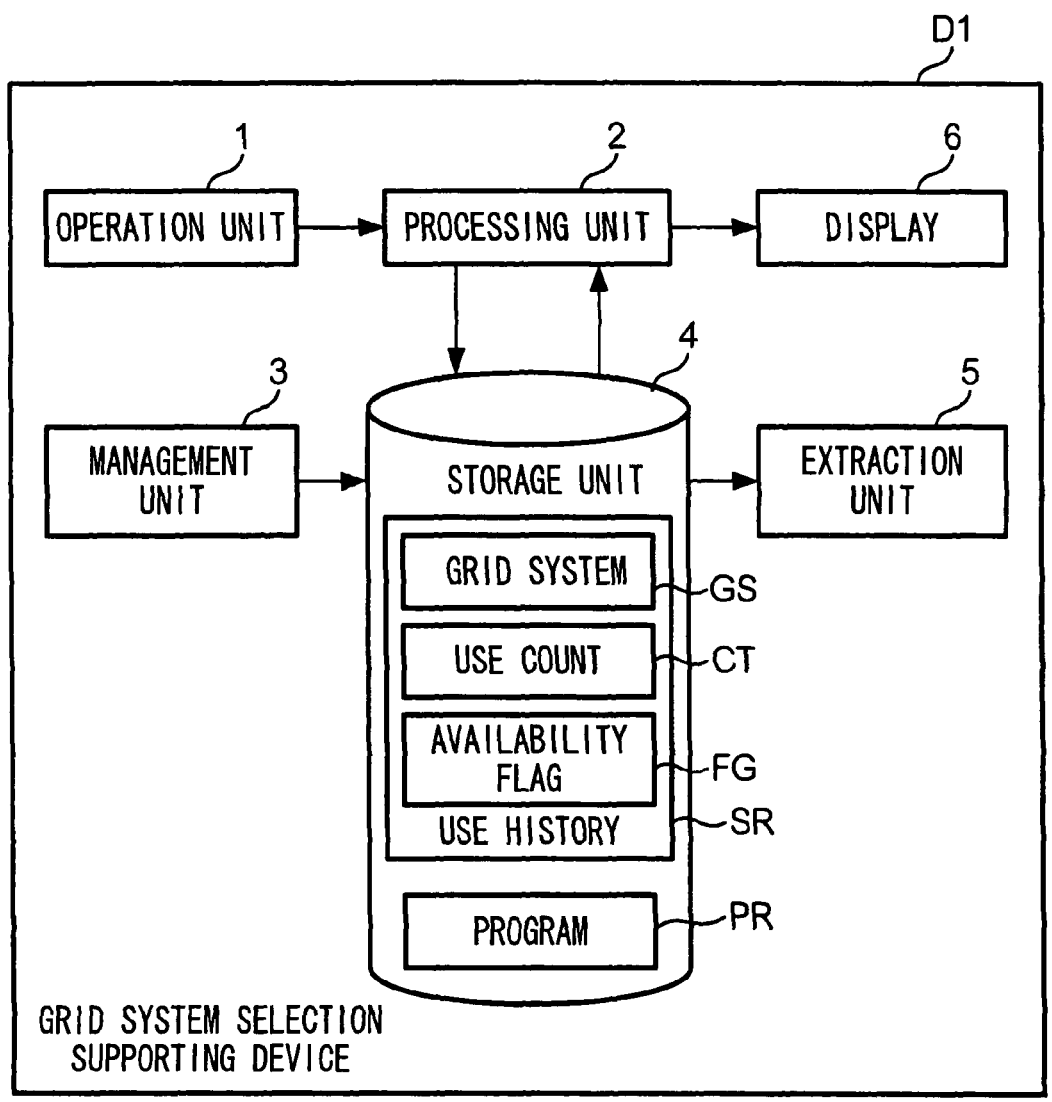
FIG. 1 shows a functional structure of a grid system selection supporting device D1 according to the first embodiment.

FIG. 1 shows a functional structure of a grid system selection supporting device D1 according to the first embodiment. The grid system selection supporting device D1 supports selection of at least one grid system among plural grid systems. The "grid system" includes a set of plural grid points used in a system for supporting editing of a document. The "grid points" refer to figures constituted by points which are used as a guide for editing a document. The "document" refers to data which includes at least one content set and layout information indicative of a layout of the at least one content set on a layout area, or refers to an output result which is output in accordance with the data. The "content set" refers to data indicative of either a text (character string) or an image. The "layout area" refers to a physical boundary of an output document or an area where an object should be arranged. For example, a layout area is one or plural paper sheets on which a document is printed, a page, plural consecutive pages, a part of a page or pages, a face of a block copy, or a display screen.

An operation unit 1 is used by an operator to input information or commands to the grid system selection supporting device D1. The operation unit 1 includes an input device such as a mouse or keyboard.

A processing unit 2 controls respective componential elements of the grid system selection supporting device D1. That is, the processing unit 2 controls operation of the grid system selection supporting device D1. The processing unit 2 includes a processing device such as a CPU (Central Processing Unit) and a storage device such as a RAM (Random Access Memory) or ROM (Read Only Memory).

A management unit 3 manages information for selecting at least one grid system from plural grid systems. More specifically, the management unit 3 sets, changes, or manages information for selecting a grid system, in accordance with a use history for each grid system.

A storage unit 4 stores the plural grid systems and use histories for the plural grid systems. The use histories each include a use count CT and an availability flag FG for the grid systems. The storage unit 4 stores a program PR which defines operation of the grid system selection supporting device D1. The storage unit 4 further stores other necessary data.

An extraction unit 5 extracts at least one grid system from the plural grid systems GS, based on the use histories.

A display 6 displays content and the at least one extracted grid system.

Figure 2:
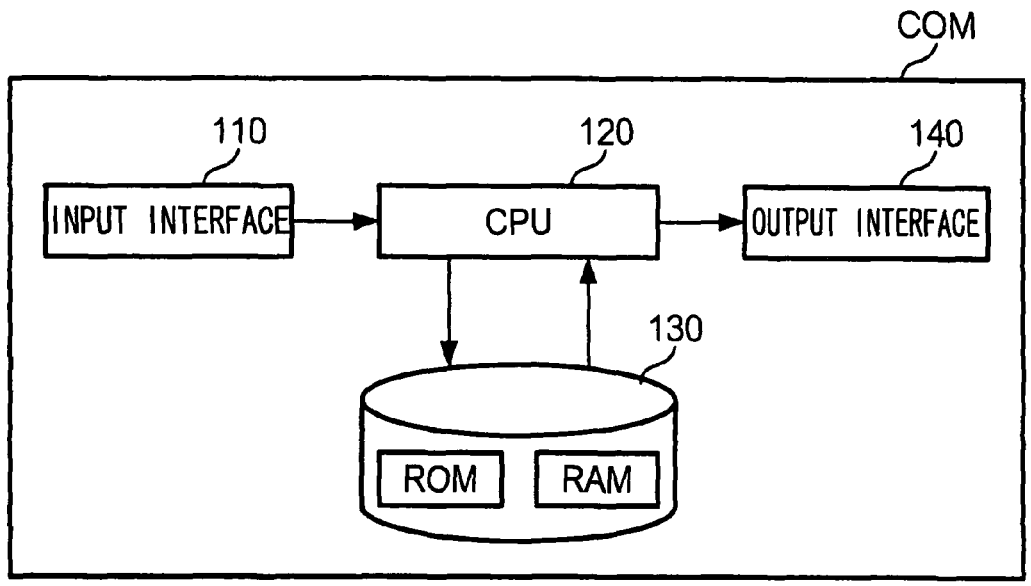
FIG. 2 shows a hardware structure of the grid system selection supporting device D1.

FIG. 2 shows a hardware structure of the grid system selection supporting device D1. Through an input interface 110, data and commands are input to the grid system selection supporting device D1. A CPU 120 is a control device which controls respective componential elements. A storage device 130 includes, for example, a ROM and a RAM. Through an output interface 140, data and commands are output to other devices and peripheral devices. The grid system selection supporting device D1 can include an external device such as an HDD (Hard Disk Drive). As the CPU 120 executes a program stored in the storage device, the grid system selection supporting device D1 constructs the functional structure as is shown in FIG. 1. For example, the operation unit 1 corresponds to the input interface 110. The processing unit 2, management unit 3, and extraction unit 5 correspond to the CPU 120. The storage unit 4 corresponds to the storage device 130. The display 6 corresponds to an output interface 140.

Figure 3:
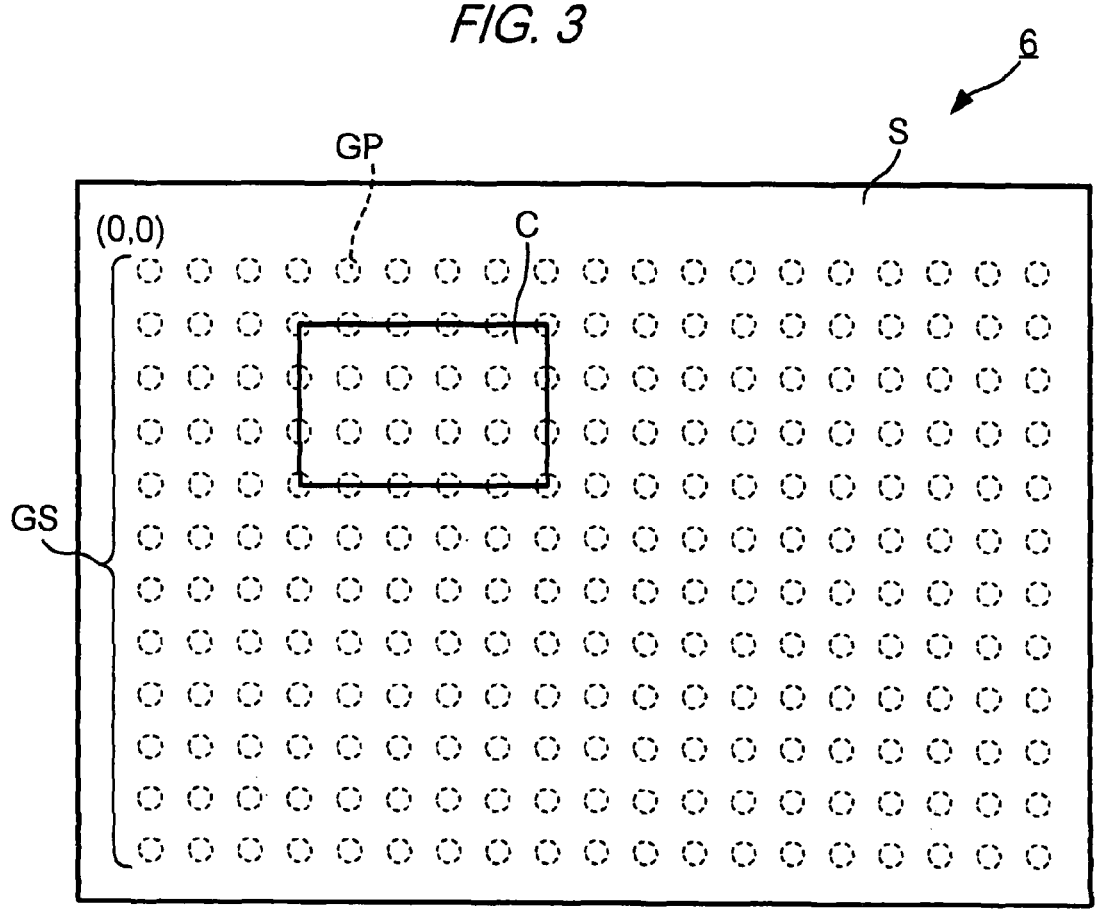
FIG. 3 shows an example of a grid system.

FIG. 3 shows an example of a grid system. This figure shows a grid system GS displayed on the display 6. If grid systems need to be specified individually, they are distinguished from each other by denoting the grid systems respectively using different reference symbols, such as grid systems GS1, GS2, . . . , and GS5. If grid systems need not be distinguished from each other, the grid systems each are simply denoted at one common reference symbol GS. The grid system GS is used to determine a position of a content set C. The grid system GS can also be used to determine size of the content set C or, in other words, to determine an area of the content set C. The size of the content set C is specified as a rectangle.

FIGS. 4, 5, and 6 show details of grid systems. FIG. 4 shows an example of a table containing parameters which are required to specify grid systems. FIGS. 5A-E show examples of grid systems to be displayed in accordance with the table of FIG. 4. FIGS. 6A-6C illustrate states of snapping content sets to grids. To "snap" a content set is to approximate a predetermined position of an area of a content set, such as a corner position or an edge position, to a close grid point. By such snapping, a predetermined position of a content set is determined based on grid points, for example, so as to correspond to a grid point. Although "constrain" is sometimes used in place of "snap" in related technical fields, the present specification uses the term "snap".

The grid system selection supporting device D1 has five grid systems GS1 to GS5. The grid systems are specified using plural attributes, e.g., a reference, a grid interval, and a snap position in this case. The reference refers to coordinates of an origin point as a reference for positions of grid points. The grid interval refers to a distance between grid points, in the meaning of a minimum distance between grid points. The snap position refers to a relative positional relationship between a content set and grid points.

The grid system GS1 has as attributes a reference (0, 0), a grid interval "10 mm", and snap positions "upper left and lower right". As is shown in FIG. 5A, the grid system GS1 has plural grid points arrayed at intervals of 10 mm, forming a grid relative to coordinates (0, 0) as a reference. According to the grid system GS1, the position and size of a content set C are determined so that upper left and lower right vertices of the content set C correspond to close grid points, as is shown in FIG. 6A. The "close grid points" refer to grid points that have a positional relationship with a target point such as an upper left vertex of a content set C. The positional relationship needs to satisfy a predetermined condition that, for example, a grid point has the shortest distance to a target point. In this example, positions of points are expressed in units of mm. However, positions of points can be expressed by a different method.

The grid system GS2 has as attributes a reference (0, 0), a grid interval of "20 mm", and snap positions "upper left and lower right". As is shown in FIG. 5B, the grid system GS2 has plural grid points arrayed at intervals of 20 mm, forming a grid relative to coordinates (0, 0) as a reference. According to the grid system GS2, the position and size of a content set C are determined so that upper left and lower right vertices of the content set C correspond to close grid points, as is also shown in FIG. 6A.

The grid system GS3 has as attributes a reference (0, 0), a grid interval of "20 mm", and snap positions "upper left and lower right". As is shown in FIG. 5C, the grid system GS3 has plural grid points arrayed at intervals of 5 mm forming a grid relative to coordinates (0, 0) as a reference. According to the grid system GS3, the position and size of a content set C are determined so that upper left and lower right vertices of the content set C correspond to close grid points, as is also shown in FIG. 6A.

The grid system GS4 has as attributes a reference (0, 0), a grid interval of "20 mm", and a snap position "lower middle". As is shown in FIG. 5D, the grid system GS4 has plural grid points arrayed at intervals of 20 mm, forming a grid relative to coordinates (0, 0) as a reference. According to the grid system GS4, the position of a content set C is determined so that a middle point of a lower edge of the content set C corresponds to a close grid point, as is shown in FIG. 6B.

The grid system GS5 has as attributes a reference (30, 30), a grid interval of "100 mm", and a snap position "left middle". As is shown in FIG. 5E, the grid system GS5 has plural grid points arrayed at intervals of 100 mm, forming a grid relative to coordinates (30, 30) as a reference. According to the grid system GS5, the position of a content set C is determined so that a middle point of a left edge of the content set C corresponds to a close grid point, as is shown in FIG. 6C.

1-2 Operation

Figure 7:
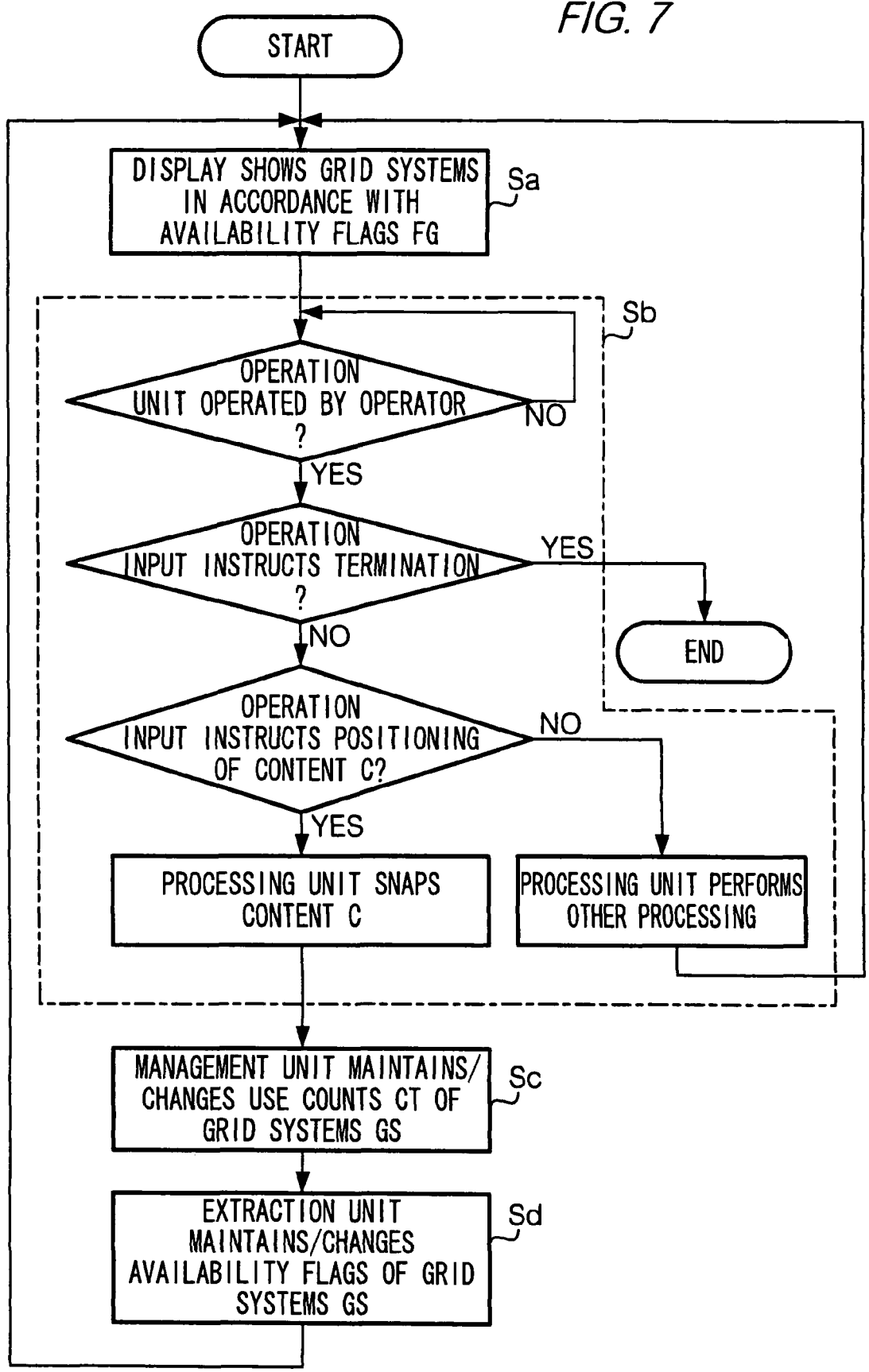
FIG. 7 is a flowchart showing operation of the grid system selection supporting device D1.

FIG. 7 is a flowchart showing operation of the system selection supporting device D1. The processing flow of the operation is briefly divided into steps Sa, Sb, Sc, and Sd. Outlines of the steps are as follows.

In a step Sa, the display 6 displays at least one of the grid systems GS1 to GS5 in accordance with availability flags. An availability flag includes information which specifies a grid system to be displayed among plural grid systems. The availability flag is included in a use history.

FIGS. 8A-8D show examples of use histories. Each use history includes an identifier for a grid system, a use count CT indicative of the number of times by which the grid system has been used, and an availability flag of the grid system. Content of each use history is overwritten by the management unit 3. A rule for overwriting the use history or an availability flag (hereinafter an "availability flag rule") in particular is predetermined. The management unit 3 overwrites the use history in accordance with the availability flag rule. An availability flag rule applied in this case is as follows. That is, availability flags of three grid systems in order from one having the greatest use count are set as "available" among five grid systems. Availability flags of the other two grid systems are set as "unavailable". If two grid systems have the third greatest use count, availability flags of total four grid systems are set as "available".

Referring again to FIG. 7, the processing unit 2 determines whether or not an operator has carried out an operation or input data via the operation unit 1. The operator manipulates the operation unit 1, seeing a screen displayed on the display 6. If the operator is determined to have input data via the operation unit 1, the processing unit 2 determines whether the operation or input concerns "positioning of a content set C" or concerns "termination". If the operation or input concerns the "positioning of the content set C", the processing unit 2 snaps the content set C to a grid point GP, as is shown in FIGS. 6A to 6C. Otherwise, if the operation or input concerns other processing than the "positioning of the content set C", the processing unit 2 performs processing specified, and if the operation or input concerns "termination", the processing unit 2 terminates the processing for supporting selection of grid systems.

In a step Sc, the management unit 3 maintains or changes the use count CT of a grid system used for positioning the content set C among the grid systems GS1 to GS5. That is, the management unit 3 updates the use history or the use count CT in particular, depending on use of the grid system.

In a step Sd, the extraction unit 5 maintains or changes the availability flags of the grid systems GS1 to GS5 in accordance with the availability flag rule. That is, the management unit 3 updates the use histories or the availability flags FG in particular, depending on use of the grid systems.

Figure 9:
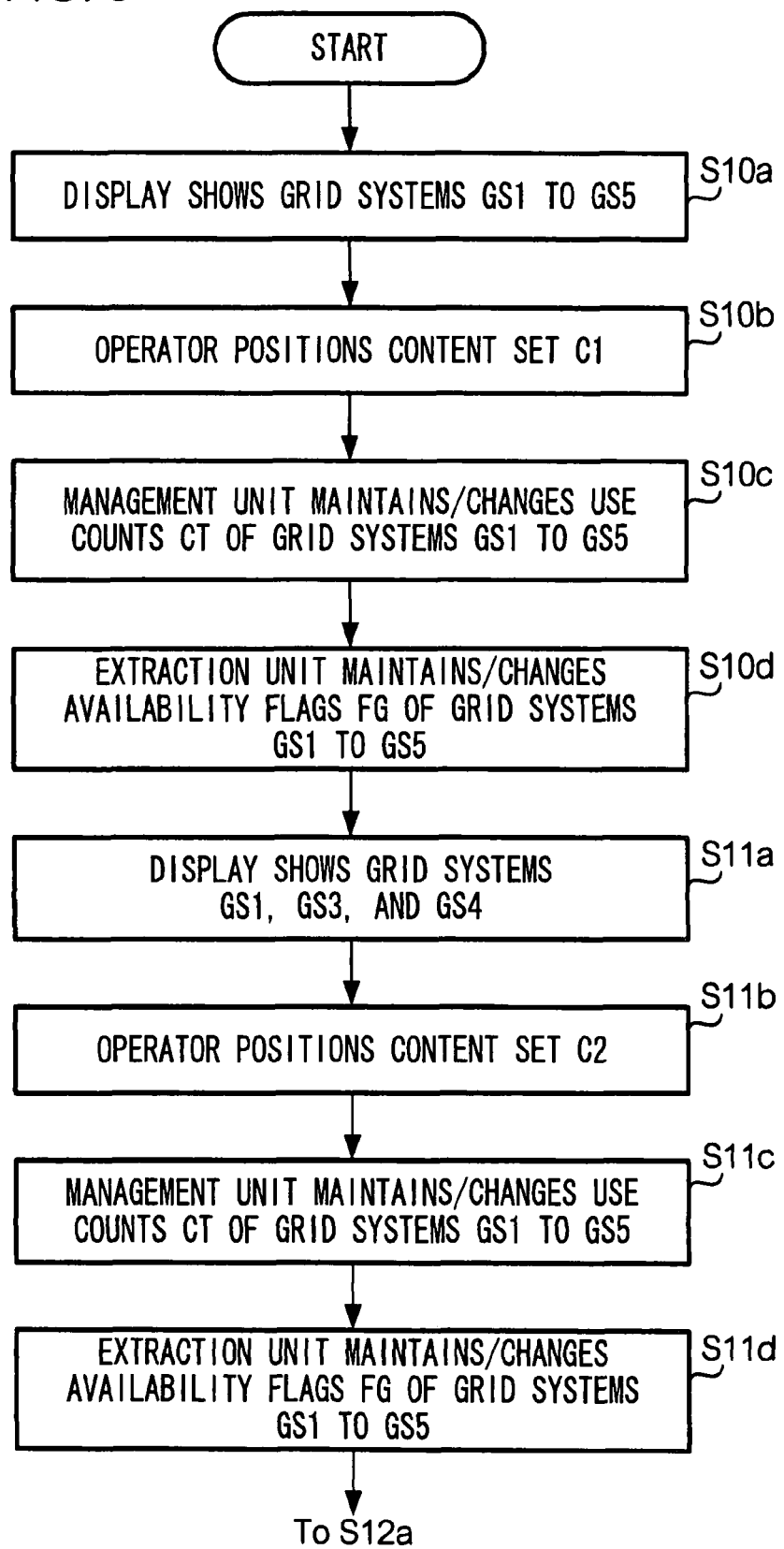
FIG. 9 is a flowchart showing operation of the grid system selection supporting device D1.
Figure 10:
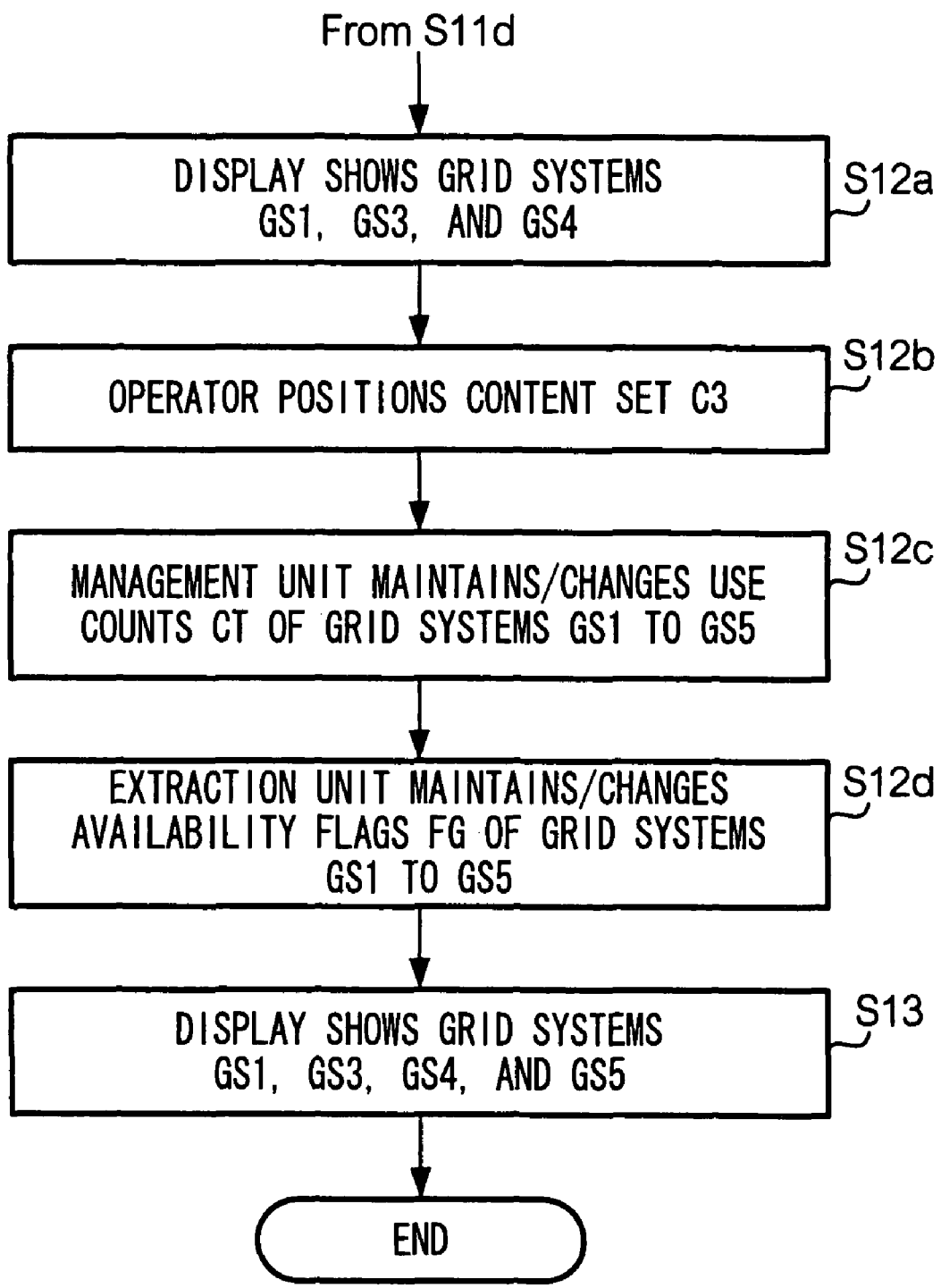
FIG. 10 is also a flowchart showing operation of the grid system selection supporting device D1.

FIGS. 9 and 10 are flowcharts showing an example of operation of the grid system selection supporting device D1. FIGS. 11A-11D show displayed grid systems. The following description will be made of an example of positioning three content sets C1 to C3. The storage unit 4 stores information shown in FIG. 8A, as initial values for use histories. That is, the use counts CT in the use histories are all "0" for the grid systems GS1 to GS5 as well as the availability flags FG all being set as "available".

Figure 11A:
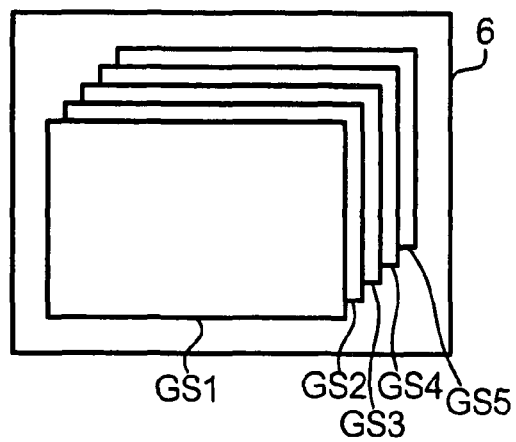
FIGS. 11A-11D show grid systems displayed.

In a step S10a, the display 6 displays grid systems, depending on the availability flags. Since the availability flags FG of the grid systems GS1 to GS5 are now all set as "available", five of the grid systems GS1 to GS5 are displayed (FIG. 11A). FIGS. 11A to 11D illustrate grid systems slightly shifted from each other, to facilitate easy understanding of the drawings. However, these figures do not mean that plural grid systems are actually positioned slightly shifted from each other. In practice, plural grid systems are arranged overlapped with one another.

In a step S10b, the operator positions the content set C1. That is, the operator manipulates the operation unit 1, on seeing a grid system displayed on the display 6. In this manner, the operator instructs positioning of the content set C1. As positioning of the content set C1 is instructed by the operator, the processing unit 2 snaps the upper left and lower right vertices of the content set C1 to grid points close to the vertices, respectively, as is shown in FIG. 6A.

FIG. 12 shows the snapped content set C1. In this embodiment, the upper left vertex of the snapped content set C1 is positioned at (30, 20), the lower right vertex at (170, 60), the lower left vertex at (30, 60), as well as the upper right vertex at (170, 20).

Referring again to FIG. 9, the management unit 3 updates use histories in a step S10c. That is, the management unit 3 detects which of the grid systems GS1 to GS5 were used for positioning the content set C1. The management unit 3 updates use histories, depending on the grid systems used. In other words, the management unit 3 manages or maintains the use counts CT of the grid systems GS1 to GS5. The management unit 3 also maintains or changes the availability flags FG. Specifically, the management unit 3 operates in the following manner.

First, the management unit 3 determines whether the grid system GS1 has been used for positioning the content set C1 or not. Since snap positions of the grid system GS1 are "upper left and lower right", the management unit 3 verifies whether the upper left vertex (30, 20) and lower right vertex (170, 60) of the content set C1 correspond to grid points of the grid system GS1. As is shown in FIG. 5A, grid points of the grid system GS1 are positioned at (0, 0), (10, 0), (20, 0), (30, 0), . . . , (20, 0), (20, 10), . . . , (20, 20), . . . , (30, 20), . . . , (170, 60), . . . . Thus, the grid system GS1 includes grid points corresponding to the upper left vertex (30, 20) and the lower right vertex (170, 60) of the content set C1. Therefore, the management unit 3 determines that the upper left and lower left vertices correspond to grid points of the grid system GS1, i.e., the grid system GS1 was used. As is shown in FIG. 8B, the management unit 3 therefore changes the use count CT of the grid system GS1 to "1" from "0".

Next, the management unit 3 determines whether the grid system GS2 was used for positioning the content set C1 or not. Since snap positions of the grid system GS2 are "upper left and lower right", the management unit 3 verifies whether the upper left vertex (30, 20) and lower right vertex (170, 60) of the content set C1 correspond to grid points of the grid system GS2. As is shown in FIG. 5B, grid points of the grid system GS2 are positioned at (0, 0), (20, 0), (40, 0), . . . , (0, 20), (20, 20), (40, 20), . . . . Thus, the grid system GS2 does not include grid points corresponding to the upper left vertex (30, 20) and the lower right vertex (170, 60) of the content set C1. Therefore, the management unit 3 determines that the upper left and lower left vertices do not correspond to grid points of the grid system GS2, i.e., the grid system GS2 was not used. As is shown in FIG. 8B, the management unit 3 maintains "0" as the use count CT of the grid system GS2.

Next, the management unit 3 determines whether the grid system GS3 was used for positioning the content set C1 or not. Since snap positions of the grid system GS3 are "upper left and lower right", the management unit 3 verifies whether the upper left vertex (30, 20) and lower right vertex (170, 60) of the content set C1 correspond to grid points of the grid system GS3. As is shown in FIG. 5C, grid points of the grid system GS3 are positioned at (0, 0), (5, 0), (10, 0), . . . , (15, 0), . . . , (30, 20), . . . , (170, 60), . . . . Thus, the grid system GS3 includes grid points corresponding to the upper left vertex (30, 20) and the lower right vertex (170, 60) of the content set C1. Therefore, the management unit 3 determines that the upper left and lower left vertices correspond to grid points of the grid system GS3, i.e., the grid system GS3 was used. As is shown in FIG. 8B, the management unit 3 changes the use count CT of the grid system GS3 from "0" to "1".

Next, the management unit 3 determines whether the grid system GS4 was used for positioning the content set C1 or not. Since a snap position of the grid system GS4 is "lower middle", the management unit 3 verifies whether the lower middle point (100, 60) as the middle point of the lower edge of the content set C1 corresponds to a grid point of the grid system GS4. As is shown in FIG. 5D, grid points of the grid system GS4 are positioned at (0, 0), (20, 0), (40, 0), . . . , (0, 20), (20, 20), (40, 20), . . . (100, 60), . . . . Thus, the grid system GS4 includes a grid point corresponding to the lower middle point (100, 60) of the content set C1. Therefore, the management unit 3 determines that the lower middle point of the content set C1 corresponds to a grid point of the grid system GS4, i.e., the grid system GS4 was used. As is shown in FIG. 8B, the management unit 3 changes the use count CT of the grid system GS4 from "0" to "1".

Next, the management unit 3 determines whether the grid system GS5 was used for positioning the content set C1 or not. Since a snap position of the grid system GS5 is "left middle", the management unit 3 verifies whether the left middle point (30, 40) as the middle point of the left edge of the content set C1 corresponds to a grid point of the grid system GS5. As is shown in FIG. 5E, grid points of the grid system GS5 are positioned at (30, 30), (130, 30), (230, 30), . . . , (30, 130), (130, 130), (230, 130), . . . . Thus, the grid system GS5 does not include a grid point corresponding to the left middle point (30, 40) of the content set C1. Therefore, the management unit 3 determines that the left middle point of the content set C1 does not correspond to a grid point of the grid system GS5, i.e., the grid system GS5 was not used. As is shown in FIG. 8B, the management unit 3 maintains "0" as the use count CT of the grid system GS5.

As is described above, the grid systems GS1, GS3, and GS4 were used to position the content set C1

In a step S10d, the extraction unit 5 updates availability flags in accordance with an availability flag rule. As is shown in FIG. 8B, three grid systems GS1, GS3, and GS4 are used frequently, so that the extraction unit 5 maintains the availability flags of these three grid systems to be "available". The extraction unit 5 further changes the settings of the availability flags of the remaining two grid systems GS2 and GS5 from "available" to "unavailable".

Figure 11B:
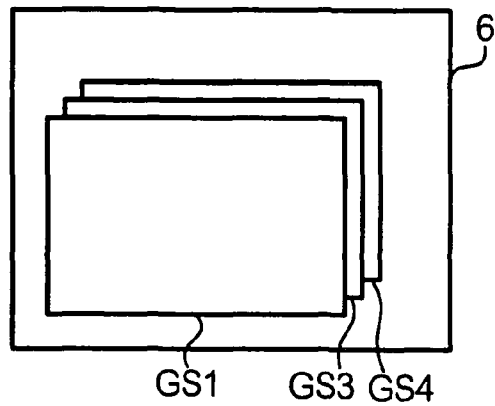

In a step S11a, the display 6 displays grid systems, depending on availability flags. The availability flags FG of the grid systems GS1, GS3, and GS4 are now set as "available" while the availability flags FG of the other grid systems are set as "unavailable". Therefore, three grid systems GS1, GS3, and GS4 are displayed (FIG. 11B).

In a step S11b, the operator positions a content set C2. This processing is performed in the same manner as in the step S10b. That is, the operator manipulates the operation unit 1, on seeing a grid system displayed on the display 6. In this manner, the operator instructs positioning of the content set C2. As positioning of the content set C2 is instructed by the operator, the processing unit 2 snaps the upper left and lower right vertices to close grid points, respectively, as is shown in FIG. 6A.

FIG. 13 shows the content set C2 snapped. In this embodiment, the upper left vertex of the snapped content set C2 is positioned at (30, 65), the lower right vertex at (95, 180), the lower left vertex at (30, 180), as well as the upper right vertex at (95, 65).

Referring again to FIG. 9, the management unit 3 updates use histories in a step S12c. This processing is performed in the same manner as in the step S10c. That is, the management unit 3 detects which of the grid systems GS1 to GS5 were used for positioning the content set C2. The management unit 3 updates use histories, depending on the grid systems used. In other words, the management unit 3 manages or maintains the use counts CT of the grid systems GS1 to GS5. The management unit 3 also maintains or changes the availability flags FG. In this example, the management unit 3 determines that the grid system GS3 was used. As is shown in FIG. 8C, the management unit 3 changes the use count of the grid system GS3 from "1" to "2".

In a step S11d, the extraction unit 5 updates availability flags in accordance with an availability flag rule. As is shown in FIG. 8C, three grid systems GS1, GS3, and GS4 are used frequently, so that the extraction unit 5 maintains the availability flags of these three grid systems to be set as "available". The extraction unit 5 also maintains the availability flags of the remaining two grid systems GS2 and GS5 to be set as "unavailable".

Figure 11C:
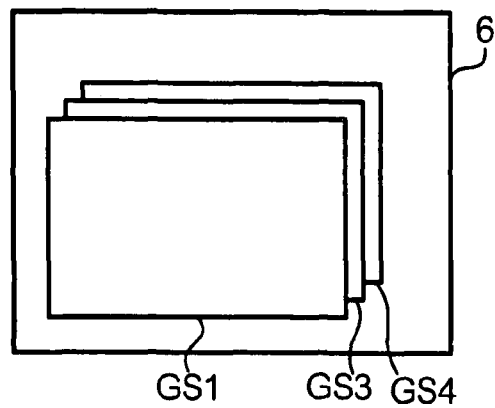

In a step S12a, the display 6 displays grid systems, depending on availability flags. The availability flags FG of the grid systems GS1, GS3, and GS4 are now set as "available" while the availability flags FG of the other grid systems are set as "unavailable". Therefore, three grid systems GS1, GS3, and GS4 are displayed (FIG. 11C).

In a step S12b, the operator positions the content set C3. This processing is performed in the same manner as in the steps S10b and S11b. That is, the operator manipulates the operation unit 1, on seeing a grid system displayed on the display 6. In this manner, the operator instructs positioning of the content set C3. As positioning of the content set C3 is instructed by the operator, the processing unit 2 snaps the upper left and lower right vertices of the content set C3 to grid points close to the vertices, respectively, as is shown in FIG. 6A.

Figure 14:
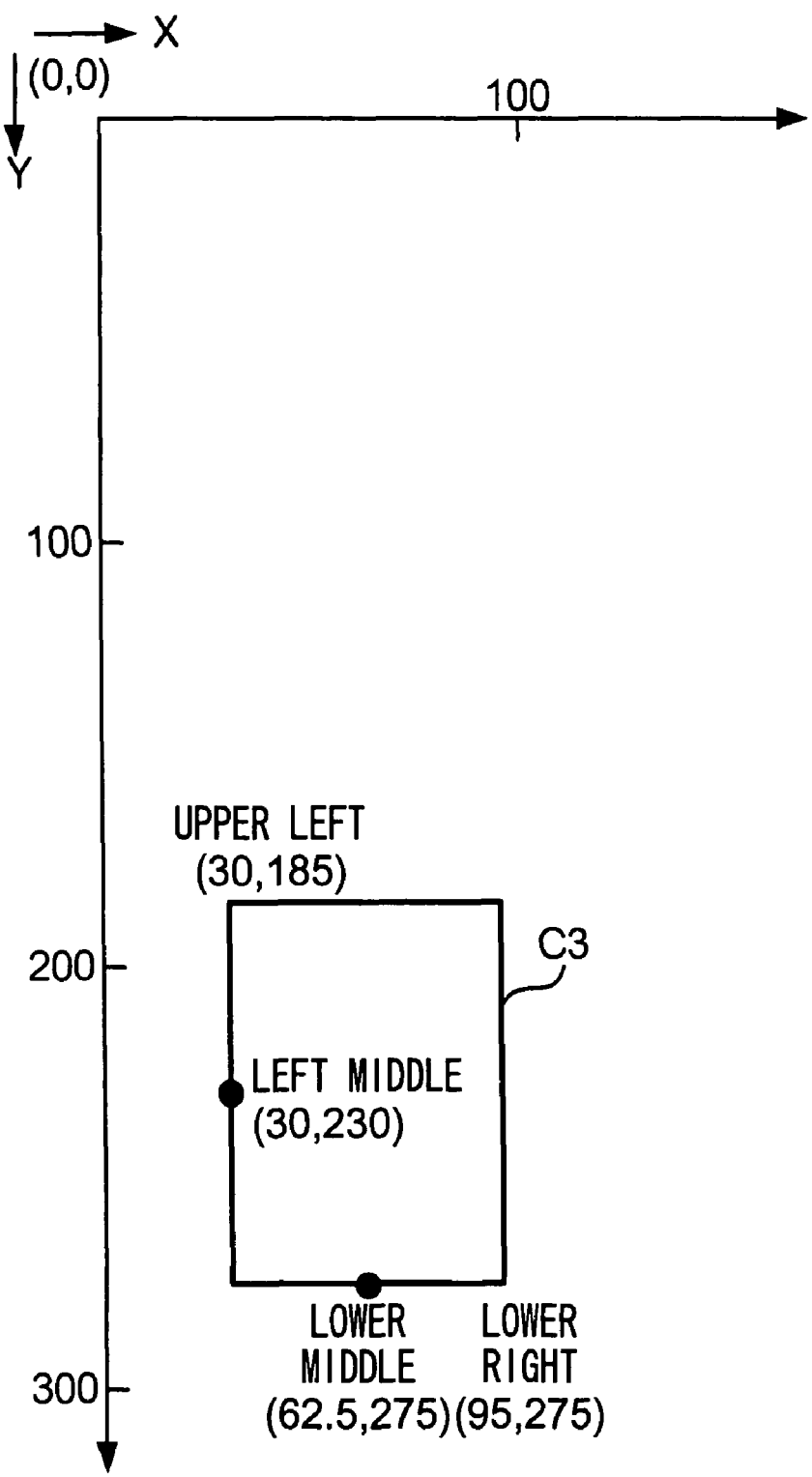
FIG. 14 shows a snapped content set C3.

FIG. 14 shows the content set C3 snapped. In this embodiment, the upper left vertex of the snapped content set C3 is positioned at (30, 185), the lower right vertex at (95, 275), the lower left vertex at (30, 275), as well as the upper right vertex at (95, 185).

Referring again to FIG. 9, the management unit 3 updates use histories in a step S12c. This processing is performed in the same manner as in the steps S10c and S11c. That is, the management unit 3 detects which of the grid systems GS1 to GS5 were used for positioning the content set C3. The management unit 3 updates use histories, depending on the grid systems used. In other words, the management unit 3 manages or maintains the use counts CT of the grid systems GS1 to GS5. The management unit 3 also maintains or changes the availability flags FG. In this example, the management unit 3 determines that the grid systems GS3 and GS5 were used. As is shown in FIG. 8D, the management unit 3 changes the use count of the grid system GS3 from "2" to "3" as well as the use count of the grid system GS5 from "0" to "1".

In a step S12d, the extraction unit 5 updates availability flags in accordance with an availability flag rule. As is shown in FIG. 8D, four grid systems GS1, GS3, GS4, and GS5 are used frequently, so that the extraction unit 5 changes or maintains the availability flags of these four grid systems to be set as "available". The extraction unit 5 further maintains the availability flag of the remaining grid system GS2 to be set as "unavailable".

The display 6 displays grid systems, depending on availability flags. The availability flags FG of the grid systems GS1, GS3, GS4, and GS5 are now set as "available" while the availability flag FG of the other grid system is set as "unavailable". Therefore, four grid systems GS1, GS3, and GS4 are displayed (FIG. 11B).

As is described above, the grid system selection supporting device D1 according to this embodiment displays grid systems in accordance with use histories. For example, when positioning the content set C3, the grid systems GS1, GS3, and GS4 are displayed on the basis of use histories concerning the grid systems previously used for positioning the content sets C1 and C2 prior to the content set C3. Thus, according to this embodiment, grid systems to be displayed are selected independently based on experiences of or determinations made by users.

1-1-3 Modifications

The invention is not limited to the embodiment described above but can be variously modified for practical use. In the description given below, elements common to the above embodiment will be denoted at common reference symbols. Of the modifications below, two or more modifications can be combined for practical use.

1-3-1 Modification 1

The number of grid systems extracted by the extraction unit 5 is not limited to three. For example, one grid system which has the greatest use count CT can be extracted (or two grid systems can be extracted when the two grid systems has the greatest use count CT). Further, any other number of grid systems can be extracted.

1-3-2 Modification 2

Initial values of use histories are not limited to those shown in FIG. 8A. In other words, initial values of the use histories can be other than "0". For example, initial use counts CT can be "3" or "5". Respective grid systems can take different initial values as use counts. Initial values of the use histories can be determined depending on a use history concerning one or more content sets prior to content sets C1 to C3. The "content sets prior to content sets C1 to C3" refer to content sets included in a document which has already been processed before a document as a target being now processed, or refer to other content sets than those included in the document as the target being now processed.

1-3-3 Modification 3

The availability flag rule used by the extraction unit 5 is not limited to the rule described in the above embodiment. The availability flag rule can be defined so as to update availability flags based on use counts CT and grid point numbers GPN. The grid point number GPN refers to a total number of grid points included in each grid system GS. In this modification, grid point numbers are accumulated in order from a grid system having the greatest use count. If the accumulated grid point numbers exceed a threshold, availability flags of grid systems grid point numbers of which have been accumulated are set as "available".

Figures 15, 16A, 16B, 17:
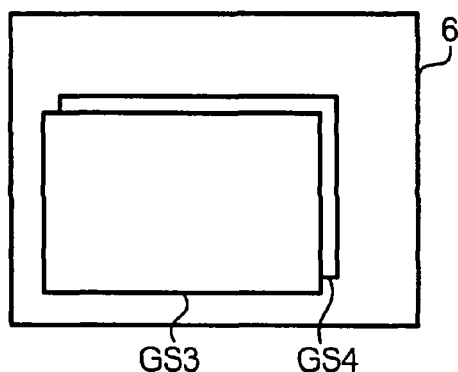
FIG. 15 is a table showing grid point numbers in Modification 3.
FIGS. 16A and 16B are tables showing initial values of use histories in Modification 3.
FIG. 17 shows a grid system displayed in Modification 3.

FIG. 15 is a table showing grid point numbers in Modification 3. In this example, grid point numbers of the grid systems GS1, GS2, GS3, GS4, and GS5 are respectively "660", "165", "2580", "165", and "6". "2700" is a threshold as a reference which is referred to when an availability flag FG is set as "available", i.e., a threshold as a reference for determining whether a grid system should be used or not.

FIGS. 16A and 16B are tables showing Initial values of a use history in Modification 3. These examples include use histories concerning other prior content sets than the content sets C1 to C3. As is shown in FIG. 16A, Initial values of use counts of the grid systems GS1, GS2, GS3, GS4, and GS5 are respectively "6", "5", "10", "8", and "2".

The management unit 3 firstly compares a grid point number "2580" of the grid system GS3 having the greatest use count CT with the threshold "2700" for grid point numbers. Since 2580<2700 is now given, the management unit 3 determines that the accumulated value of grid point numbers does not exceed the threshold.

Next, the management unit 3 accumulates grid points up to the grid system having the second greatest use count CT, i.e., the grid system GS4. Specifically, the management unit 3 adds the grid point number "165" of the grid system GS4 to the grid point number "2580" of the grid system GS3, to obtain an accumulated value "2745". The management unit 3 compares the accumulated value "2745" with the threshold "2700". Since 2745>2700 is now given, the management unit 3 determines that the accumulated value of grid point numbers exceeds the threshold. Upon this determination, the extraction unit 5 sets "available" for availability flags of previous grid systems and "unavailable" for availability flags of the other grid systems. That is, the extraction unit 5 sets "available" as the availability flags of the grid systems GS3 and GS4 as well as "unavailable" as the availability flags of the grid systems GS1, GS2, and GS5.

FIG. 17 shows grid systems displayed in Modification 3. According to the use histories shown in FIG. 16B, for example, the grid systems GS3 and GS4 are displayed in the step S11a, S12a, or S13.

1-3-4 Modification 4

In the embodiment or modifications described above, an availability flag is set for each grid system. Alternatively, an availability flag can be set for each grid point. In this case, the processing for maintaining or changing use histories is carried out in the same manner as described with reference to, for example, the steps S10c, S11c, and S12c.

FIG. 18 is a table showing grid points and snap methods respectively related to the grid points. The storage unit 4 stores the table of FIG. 18. In this example, the stored tables shows that an "upper left (vertex)" or "lower right (vertex)" should be snapped to a grid point (0, 0).

FIG. 19 is a table showing an example of a use history according to Modification 4. FIG. 20 is a table showing use counts totalized for each grid point. In this example, the use counts of grid systems GS1 to GS5 are respectively "6", "5", "10", "8", and "2". For example, a grid point (10, 10) belongs to both the grid systems GS1 and GS3. The use counts of the grid systems GS1 and GS3 are respectively "6" and "10". Therefore, the management unit 3 totalizes use counts of the grid point (10, 10), to obtain a subtotal SM of "16". FIG. 20 shows results which are finally obtained.

FIG. 21 is a table showing examples of availability flags according to Modification 4. The table shown in FIG. 21 is prepared as follows. The extraction unit 5 rearranges grid points in order from one having the greatest subtotal SM. The extraction unit 5 also calculates an accumulated total CU of use counts. Further, the extraction unit 5 sets "available" for availability flags of grid points existing within a range in which the accumulated total CU does not exceed a threshold (for example, "500"). Also, the extraction unit 5 sets "unavailable" for availability flags of grid points within a range in which the accumulated total CU exceeds the threshold.

In the example of FIG. 21, the accumulated total CU is "504" if the subtotal "16" of use counts of the grid point (0, 0) is added. Since this accumulated total CU exceeds "500" as a threshold, the extraction unit 5 sets "available" for availability flags of grid points prior to the grid point (0, 0), i.e., the grid points (20, 20) to (10, 10) which are in higher ranks than the grid point (0, 0). The extraction unit 5 sets "unavailable" for availability flags of grid points following the grid point (0, 0), including this grid point (0, 0).

2 Second Embodiment

The second embodiment of the invention will now be described. Descriptions of features common to the first embodiment will be omitted herefrom. Constitutional elements common to the first embodiment will be denoted by common reference symbols in the descriptions below.

2-1 Structure

The structure of a grid system selection supporting device according to this embodiment is the same as that described with reference to FIGS. 1 and 2. In this embodiment, positioning of n content sets C1 to Cn (where n is an integer not smaller than 2) is determined.

The management unit 3 calculates a weighted distance PD in a manner as will be described later.

The storage unit 4 stores use histories SR including information indicating how grid systems GS1 to GS5 were used when at least one content set prior to a content set C was positioned. The storage unit 4 stores parameters (FIG. 4) and use histories (FIGS. 8A-8D). These parameters are required to specify content of each grid system, i.e., to specify grid systems. The use histories can be overwritten. For example, when positioning a content set C2 among content sets C1 to C3, use histories SR reflect positioning of the content set C1. In a similar manner, when positioning the content set C3, use histories SR reflect positioning of the content set C2. The storage unit 4 also stores a program PR which defines operation of the processing unit 2, management unit 3, and extraction unit 5.

The storage unit 4 also stores a snap method for each grid point, as is shown in FIG. 18. For example, the storage unit 4 stores a method in which a grid point (0, 0) should allow an "upper left" vertex or "lower right" vertex of a content set to be snapped to.

2-2 Operation

Figure 22:
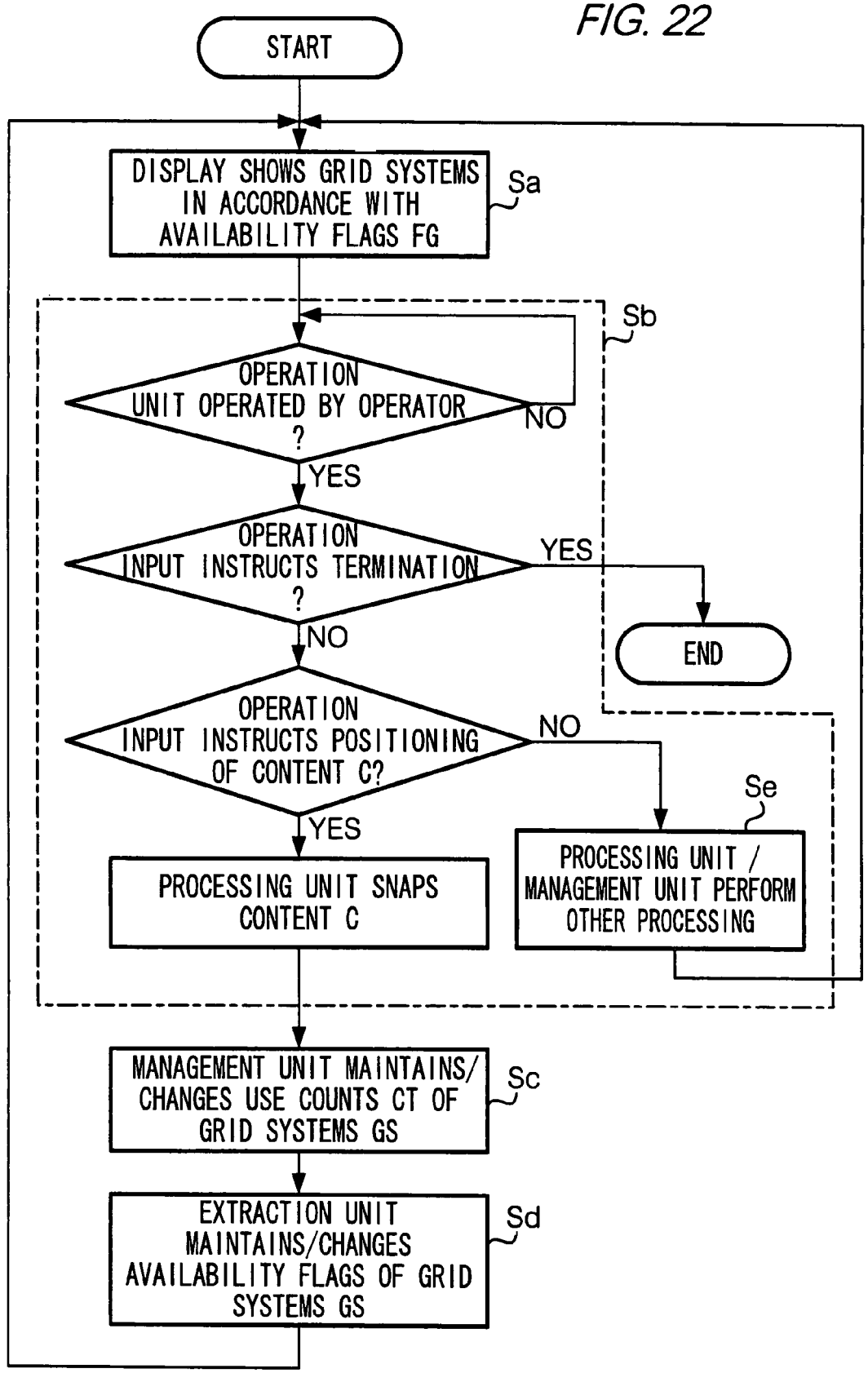
FIG. 22 is a flowchart showing operation of a grid system selection supporting device D1 according to the second embodiment.

FIG. 22 is a flowchart showing operation of the grid system selection supporting device D1 according to the second embodiment. Processing performed in steps Sa to Sd is basically the same as that described in the first embodiment. However, a step Se performs different processing of, for example, changing colors of the content sets C1 to Cn.

When a content set is snapped to a grid point in the step Sb, the management unit 3 calculates a subtotal SM of use counts for each of grid systems whose snap position is the same as a position to be snapped to of the content set (FIG. 18).

Figure 23:
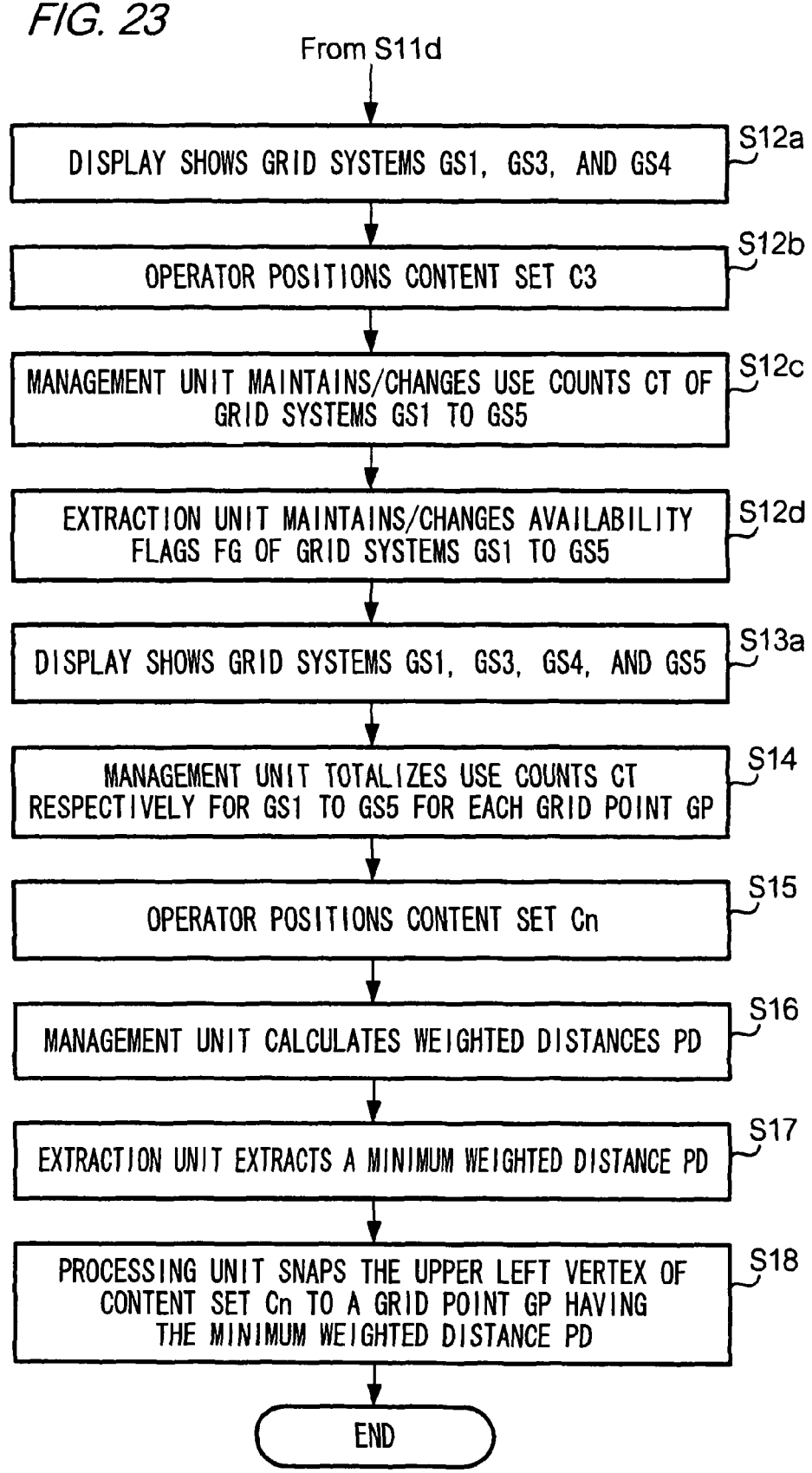
FIG. 23 is a flowchart showing a specific example of operation of the grid system selection supporting device D1.

FIG. 23 is a flowchart showing a specific example of operation of the grid system selection supporting device D1. A processing flow prior to FIG. 23 is the same as that shown in FIG. 9. In this example, content sets which the operator is going to position, as targets to be processed, are content sets C1 to Cn. Also in this example, an "upper left" vertex of each content is snapped to a grid point. Initial values of the use histories are the same as those shown in FIG. 8A. That is, use counts CT are all "0" and availability flags are all set as "available" in the initial stage.

Figure 11D:
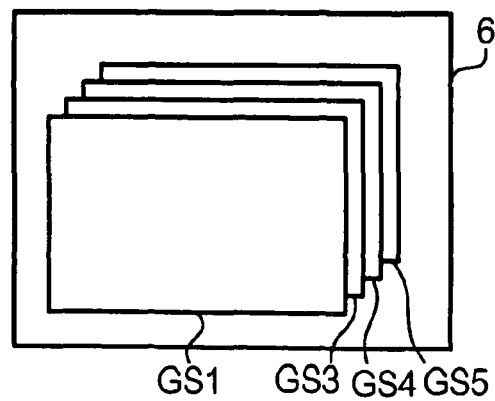

Processing in the steps S10a to S12d is the same as described in the first embodiment. In the step S13a, the display 6 displays grid systems in accordance with availability flags. At this time point, availability flags of grid systems GS1, GS2, GS4, and GS5 are set as "available", as is shown in FIG. 8D, the display 6 displays the grid systems GS1, GS2, GS4, and GS5 (FIG. 11D). In a similar manner, the use histories are recorded up to a content set C(n−1), i.e., from the content set C1 to the content set C(n−1).

FIG. 24 is a table showing examples of use counts. The following description will be made of an exemplary case in which use counts of the grid systems GS1 to GS5 are respectively "8", "5", "10", "6", and "2". The management unit 3 totalizes use counts of respective grid systems for each grid point.

FIG. 25 is a table showing examples of totalized use counts. For example, a grid point (10, 10) belongs to grid systems GS1 and GS3 both of which take "upper left" as a snap position (FIG. 4). The snap position of "upper left" is the same as the position of "upper left" to be snapped of the content sets C1 to Cn. The management unit 3 adds up use counts "8" and "10" of the grid systems GS1 and GS3, to obtain "18" as a subtotal SM.

In another example, a grid point (30, 30) belongs to grid systems GS1, GS3, and GS5. Among these grid systems, the grid systems GS1 and GS3 have the same snap position as the snap position of content sets. The grid system GS5 has a snap position of "upper left" (FIG. 4) which differs from the snap positions of the content sets C1 to Cn. Therefore, the management unit 3 adds up use counts "8" and "10" of the grid systems GS1 and GS3, to obtain "18" as a subtotal SM. However, the use count "2" of the grid system GS5 is not added.

Referring again to FIG. 23, the operator instructs positioning of the content set Cn in the step S15.

Figures 26, 27:
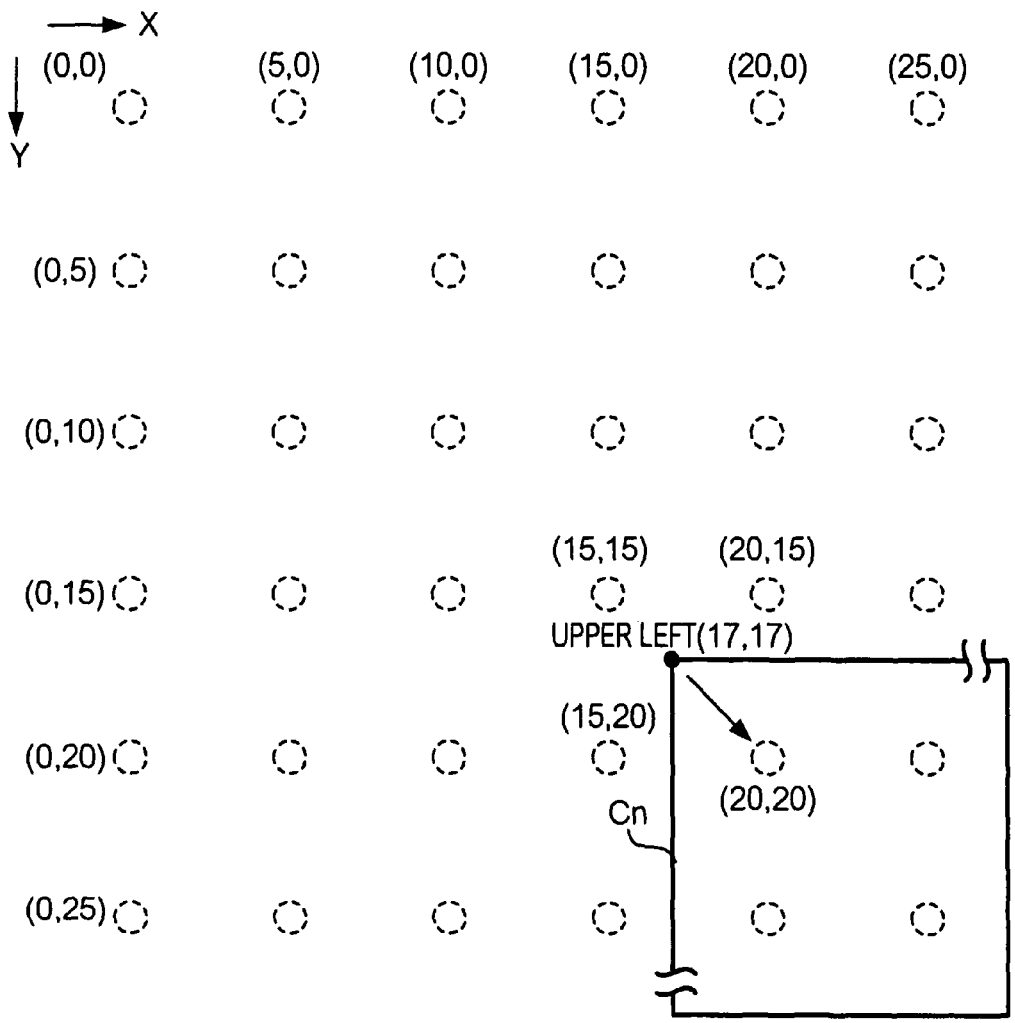
FIG. 26 exemplarily shows positioning of a content set Cn.
FIG. 27 is a table showing weighted distances PD.

FIG. 26 shows an example of positioning of the content set Cn. The content set Cn is positioned so that the upper left vertex is positioned at (17, 17).

Referring again to FIG. 23, the management unit 3 calculates weighted distances PD between an upper left vertex of the content set Cn and grid points close to the vertex. In this example, four grid points (15, 15), (15, 20), (20, 15), and (20, 20) are close to the upper left vertex of the content set Cn. For example, a weighted distance PD between the upper left vertex (17, 17) and the grid point (15, 15) is calculated as follows. The management unit 3 calculates a ratio r between a maximum value among subtotals SM of the close grid points and a subtotal SM of the grid point (15, 15) as a target. In this example, the maximum value among the subtotals SM of use counts of close grid points is "23" which is the subtotal SM of use counts of the grid point (20, 20). The grid point (15, 15) as a target has "10" as a subtotal SM of use counts. Therefore, the ratio r=23/10=2.3 is given. The management unit 3 multiplies a distance of $\sqrt{(15-17)^2+(15-17)^2}$ between the upper left vertex (17, 17) and the grid point (15, 15) by the ratio r to obtain a weighted distance PD of "18.4". With respect to the other grid points (15, 20), (20, 15), and (20, 20), the management unit 3 obtains "29.9", "29.9", and "18" as weighted distances PD.

In a step S17, the extraction unit 5 extracts a grid point having the shortest weighted distance, which is a minimum weighted distance, among close grid points. In this example, the grid point (20, 20) has the minimum weighted distance.

FIG. 27 is a table showing weighted distances PD. The extraction unit 5 determines that the content set Cn should be snapped to the extracted grid point, i.e., the grid point (20, 20) in this case.

Referring again to FIG. 23, the processing unit 2 snaps the upper left vertex of the content set Cn to the grid point (20, 20) in the step S18, as indicated by the an arrow in FIG. 26. Thus, according to this embodiment, a grid point to which a content set is to be snapped is determined on the based of weighted distances.

2-3 Modifications

The invention is not limited to the embodiments as described above but can be variously modified for practical use. In the description given below, elements common to the above embodiments will be denoted by common reference symbols. Of the modifications described below, two or more modifications can be combined for practical use. Further, the first embodiment or modifications thereof can be combined with the second embodiment or modifications thereof.

2-3-1 Modification 1

Figures 28, 29:
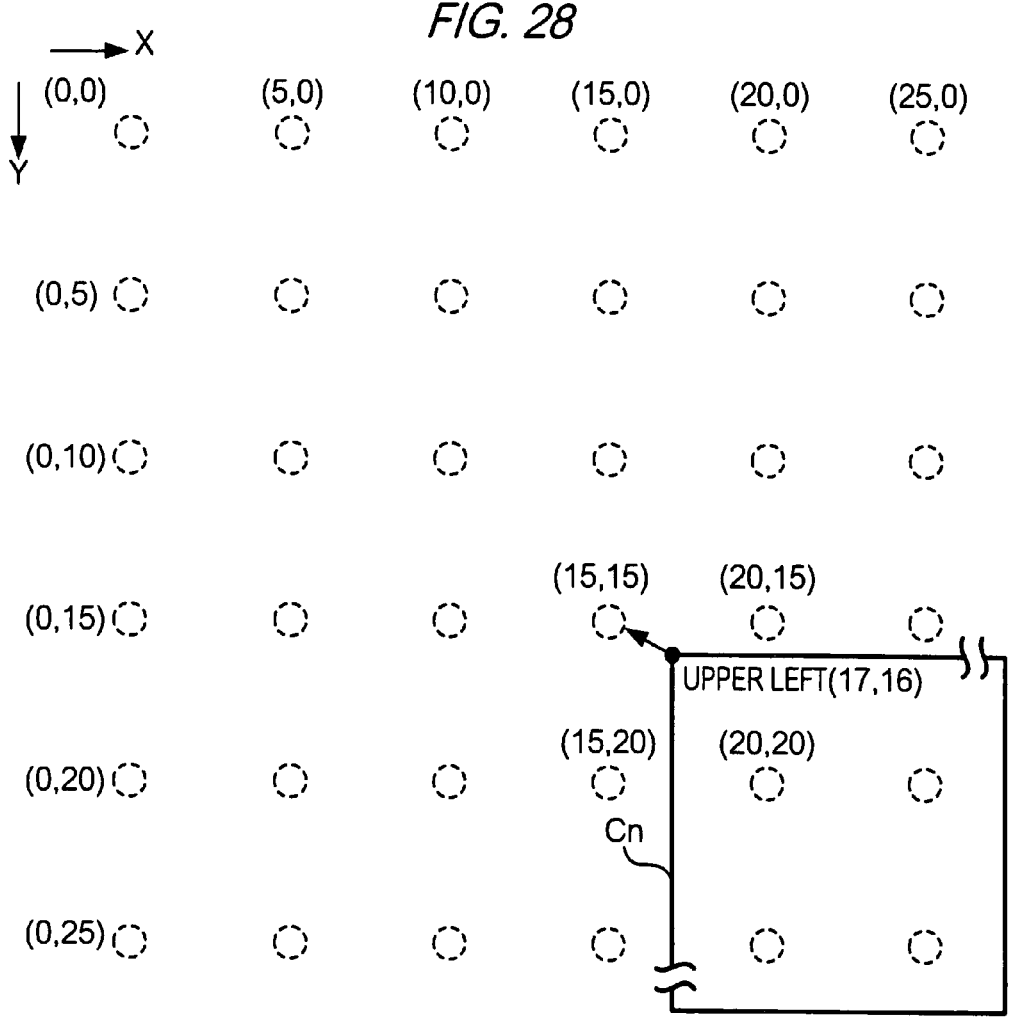
FIG. 28 shows positioning of the content set Cn according to Modification 1.
FIG. 29 is a table showing weighted distances in Modification 1.

FIG. 28 shows positioning of a content set Cn according to Modification 1. FIG. 29 is a table showing weighted distances in Modification 1. In this example, an upper left vertex is positioned at (17, 16), according to positioning of the content set Cn as instructed by an operator. Four grid points (15, 15), (15, 20), (20, 15), and (20, 20) are close to the vertex, as described in the second embodiment. With respect to these four grid points, weighted distances are "1.5", "46", "23", and "25", respectively. Therefore, the extraction unit 5 extracts the grid point (15, 15) as a grid point having the minimum weighted distance. The processing unit 2 snaps the upper left vertex of the content set Cn to the grid point (15, 15).

2-3-2 Modification 2

FIGS. 30 and 31 show grid systems according to Modification 2. In Modification 2, four grid systems GS2, GS4, GS6, and GS7 are used. The grid systems GS2 and GS4 are the same as those described in the second embodiment.

The grid system GS6 has as attributes a reference (0, 0), a grid interval "15 mm", and snap positions "upper left and lower right". As is shown in FIG. 31A, the grid system GS6 has plural grid points arrayed at intervals of 15 mm, forming a grid relative to coordinates (0, 0) as a reference. According to the grid system GS6, a content set is snapped so that upper left and lower right vertices of the content set correspond to close grid points, as is shown in FIG. 6A.

The grid system GS7 has as attributes a reference (30, 30), grid intervals of "100 mm in the X direction" and "30 mm in the Y direction", and a snap position "left middle". As is shown in FIG. 31B, the grid system GS7 has plural grid points arrayed at intervals of 100 mm in the X direction and 30 mm in the Y direction, forming a grid relative to coordinates (0, 0) as a reference. According to the grid system GS7, a content set is snapped so that a left middle point which is a middle point of a left edge of the content set corresponds to a close grid point (FIG. 6C).

FIG. 32 is a table showing as an example of a part of use histories according to Modification 2. Described below will be a case of positioning (n−1) content sets C1 to C(n−1) among n content sets C1 to Cn. In this example, use counts of grid systems GS6, GS2, GS4, and GS7 are respectively "4", "6", "2", and "2". The management unit 3 totalizes use counts of respective grid systems for each grid point.

FIG. 33 is a table showing totalized results of use counts. For example, the grid system GS6 including a grid point (0, 30) takes a snap position of "upper left". This snap position is the same as the position "upper left" to be snapped to of content sets C1 to Cn as targets to be processed. Therefore, the management unit 3 obtains a use count "4" of the grid system GS6 as a subtotal SM of use counts.

Another example will now be discussed about a grid point (0, 0). The grid point (0, 0) belongs to grid systems GS6, GS2, and GS4. Of these grid systems, the grid systems GS6 and GS2 include "upper left" as a snap position. This snap position corresponds to the position "upper left" to be snapped to of the content sets C1 to Cn. On the other side, a snap position of the grid system GS4 is "lower middle" which differs from the position "upper left" to be snapped to of the content sets C1 to Cn. The management unit 3 adds up use counts of grid systems which have the same snap position as the snap position of the content sets. That is, the management unit 3 adds up use counts "4" and "6" of the grid systems GS6 and GS2, to obtain "10" as a subtotal SM. The use count of the grid system GS4 is not added.

Figure 34:
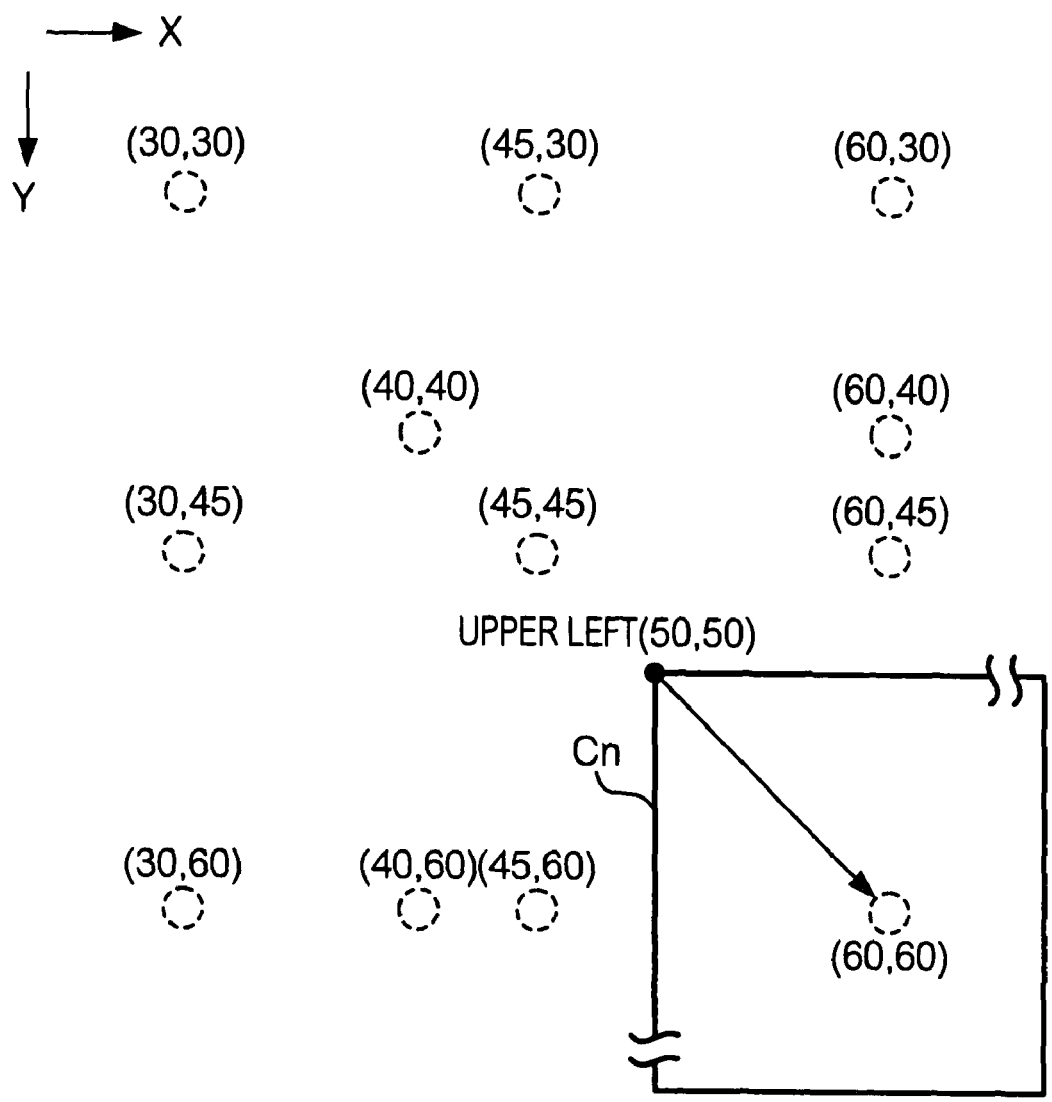
FIG. 34 shows positioning of the content set Cn according to Modification 2.

FIG. 34 shows positioning of a content set Cn in Modification 2. In this example, the operator instructs the position of the content set Cn, i.e., instructs a representative point, which is an upper left vertex of the content set Cn, to be positioned at (50, 50).

The management unit 3 calculates weighted distances PD from the upper left vertex of the content set Cn to grid points existing within a range of a predetermined distance from the vertex. In this case, the predetermined distance is the longest one of grid point intervals of grid systems which have the same snap position as the snap position of the content set Cn. Specifically in this example, the maximum grid point interval "20 mm" is used as a parameter for deciding a range (hereinafter a "target range") within which weighted distances are calculated, among grid point intervals "15 mm" and "20 mm" of the grid systems GS6 and GS2. Then, the management unit 3 calculates weighted distances PD from the upper left vertex to the grid points (30, 30), (30, 45), . . . , (60, 45), (60, 60).

For example, the management unit 3 calculates a weighted distance PD between an upper left vertex and a grid point (30, 30) in the following manner. The management unit 3 calculates a weight coefficient. Used as the weight coefficient is a power of a ratio between a maximum value among subtotals SM of use counts of respective grid points existing within a target range and a subtotal SM of use counts of a grid point as a target. For example, a square of the ratio is used as a weight coefficient. In this example, the maximum value is "10" which is a subtotal SM of use counts of the grid point (60, 60). A subtotal SM of use counts of the grid point (30, 30) as a target is "4". Therefore, a square of a ratio between these values, e.g., $(10/4)^2$ is used as the weight coefficient. Distance between the upper left vertex (50, 50) and the grid point (30, 30) is multiplied by the weight coefficient to obtain "2500.00" as a weighted distance PD.

FIG. 35 is a table showing examples of calculated weighted distances PD. The extraction unit 5 extracts minimum one of the weighted distances, i.e., "200.00" in this case. This weighted distance corresponds to a grid point (60, 60). The processing unit 2 snaps the upper left vertex of the content set to the grid point (60, 60) (as indicated by an arrow in FIG. 34).

Thus, according to Modification 2, a grid point to which a content set should be snapped is determined by an weighted calculation using as a weight coefficient a power of a ratio between a maximum value of subtotals SM of use counts of respective grid points existing within a target range and a subtotal SM of use counts of a grid point as a target.

2-3-3 Modification 3

FIG. 36 is a table showing weighted distances according to Modification 3. Weight coefficients used In Modification 3 are not limited to the square of a ratio between a maximum value of subtotals SM of use counts of respective grid points existing within a target range and a subtotal SM of use counts of a grid point as a target. A third or fourth power of the ratio can be used. In the example of FIG. 36, the upper left vertex of the content set is positioned at (53, 30), and a fourth power of the ratio is used as a weight coefficient.

2-3-4 Modification 4

FIG. 37 shows weighted distances according to Modification 4. In Modification 2, the longest one of grid point intervals of grid systems which have the same snap position as a snap position of a content set Cn is used as a parameter for deciding a target range. However, the parameter for deciding a target range is not limited to the longest one of grid point intervals. A distance obtained by multiplying a distance between the upper left vertex of a content set Cn and a proximal grid point by a coefficient can be used as the parameter for deciding the target range. The proximal grid point refers to a grid point which is least distant from a representative point (e.g., an upper left vertex) of the content set Cn. Used as a coefficient is, for example, a power (e.g., a square) of a ratio between minimum and maximum ones of subtotals SM of use counts of all grid points to which the upper left vertex of the content set can be snapped. In the example of FIG. 37, the minimum use count is "4" and the maximum use count is "10". If the upper left vertex of the content set is positioned at (53, 30) and the proximal grid point is (60, 30), the parameter for deciding the target range is $\sqrt{[\{(60-53)^2\}\times(10/4)^2]}=44$ mm.

2-3-5 Modification 5

In the second embodiment and related modifications described above, an example of snapping an upper left vertex to a grid point has been dealt with. However, the position to be snapped to is not limited to the upper left vertex. Any position of a content set can be snapped to a grid point. For example, two points (upper left and lower right vertices) of a content set can be snapped to grid points, as described in the first embodiment. In this case, processing described in the second embodiment is performed for each of the vertices, to determine grid points to which the vertices should be snapped.

2-3-6 Modification 6

In the second embodiment and related modifications described above, processing for deciding a grid point to which a content set Cn should be snapped has been dealt with. However, for other content sets than the content set Cn, grid points to which the other content sets should be snapped can be determined.

What is claimed is:

1. A grid system selection supporting device comprising:
a storage unit that stores use histories for a plurality of grid systems; and
an extraction unit that extracts at least one of the plurality of grid systems, based on the use histories, wherein
the use histories include use counts as numbers of times by which the plurality of grid systems have been used, respectively, and
the extraction unit is configured to extract the at least one of the plurality of grid systems, based on the use counts.

2. The grid system selection supporting device according to claim 1, further comprising a management unit that manages the use counts.

3. The grid system selection supporting device according to claim 2, wherein initial values of the use histories reflect use histories concerning a content set prior to a content set as a target being now processed.

4. The grid system selection supporting device according to claim 1, wherein the storage unit further stores numbers of grid points which are included in the grid systems, respectively, the management unit is configured to calculate a total of the grid points by adding up the numbers of grid points in order starting from one of the plurality of grid systems having the greatest use count, and the extraction unit is configured to extract one or more of the plurality of grid systems, the grid points of which have been added up before the total of the grid points exceeds a threshold.

5. The grid system selection supporting device according to claim 1, wherein the management unit is configured to calculate an accumulated total of use counts of the grid points by adding up totals of use counts of the grid points in order from one of the plurality of grid systems having the greatest use count, and the extraction unit is configured to extract one or more of the plurality of grid systems, the totals of the use counts of the grid points of which have been added up before the accumulated total exceeds a threshold.

6. A grid system selection supporting method using a computer having a processor, the method comprising extracting, by the processor, at least one of a plurality of grid systems, based on use histories respectively for the plurality of grid systems, wherein the use histories include use counts as numbers of times by which the plurality of grid systems have been used, respectively, and the at least one of the plurality of grid systems is extracted based on the use counts.

7. A computer readable storage medium storing a program causing a computer having a processor to execute a process, the process comprising:

extracting, by the processor, at least one of a plurality of grid systems, based on use histories respectively for the plurality of grid systems, wherein the use histories include use counts as numbers of times by which the plurality of grid systems have been used, respectively, and the at least one of the plurality of grid systems is extracted based on the use counts.

8. A grid system selection supporting device comprising:

a storage unit that stores use histories respectively for a plurality of grid systems each having a plurality of grid points;

an operation unit for instructing positioning of a content set;

a calculation unit that calculates weighted distances obtained by weighting distances on the basis of the use histories, the distances respectively being between a plurality of close grid points to the content set among the plurality of grid points and the content set, the positioning of which has been instructed by the operation unit; and an extraction unit that extracts one of the plurality of close grid points on the basis of the weighted distances calculated by the calculation unit, wherein the use histories include use counts as numbers of times by which the plurality of grid systems have been used, respectively, and the extraction unit is configured to extract the at least one of the plurality of grid systems, based on the use counts.

9. The grid system selection supporting device according to claim 8, wherein the calculation unit is configured to calculate each of the weighted distances by multiplying a distance between the content set and one of the plurality of close grid points as a target being now calculated, by a ratio between a maximum value among totals of use counts of the plurality of close grid points and a use count of the one of the plurality of close grid points as the target being now calculated.

10. The grid system selection supporting device according to claim 8, wherein the extraction unit is configured to extract one grid point among the plurality of close grid points, the extracted one grid point having the shortest weighted distance among the weighted distances calculated by the calculation unit.

11. A grid system selection supporting method using a computer having a processor, the method comprising:

instructing, by the processor, positioning of a content set;

calculating, by the processor, weighted distances obtained by weighting distances on the basis of use histories respectively for a plurality of grid systems each having a plurality of grid points, the distances respectively being between a plurality of close grid points to the content set among the plurality of grid points and the content set, the positioning of which has been instructed; and extracting, by the processor, one of the plurality of close grid points on the basis of the weighted distances calculated, wherein the use histories include use counts as numbers of times by which the plurality of grid systems have been used, respectively, and the at least one of the plurality of grid systems is extracted based on the use counts.

12. A computer readable storage medium storing a program causing a computer having a processor to execute a process, the process comprising:

instructing, by the processor, positioning of a content set;

calculating, by the processor, weighted distances obtained by weighting distances on the basis of use histories respectively for a plurality of grid systems each having a plurality of grid points, the distances respectively being between a plurality of close grid points to the content set among the plurality of grid points and the content set, the positioning of which has been instructed; and extracting, by the processor, one of the plurality of close grid points on the basis of the weighted distances calculated, wherein the use histories include use counts as numbers of times by which the plurality of grid systems have been used, respectively, and the at least one of the plurality of grid systems is extracted based on the use counts.

* * * * *